United States Patent
Ishii et al.

(10) Patent No.: US 6,946,820 B2
(45) Date of Patent: Sep. 20, 2005

(54) MULTIPLE OUTPUT DC-DC CONVERTER FOR PROVIDING CONTROLLED VOLTAGES

(75) Inventors: Takuya Ishii, Suita (JP); Nobuyoshi Nagagata, Yawata (JP); Hiroshi Saito, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 3 days.

(21) Appl. No.: 10/450,768

(22) PCT Filed: Sep. 5, 2002

(86) PCT No.: PCT/JP02/09064

§ 371 (c)(1),
(2), (4) Date: Jun. 16, 2003

(87) PCT Pub. No.: WO03/026116

PCT Pub. Date: Mar. 27, 2003

(65) Prior Publication Data

US 2004/0027104 A1 Feb. 12, 2004

(30) Foreign Application Priority Data

Sep. 12, 2001 (JP) .................................. 2001-276279

(51) Int. Cl.⁷ .............................................. G05F 1/613
(52) U.S. Cl. ........................ 323/222; 323/267; 323/283
(58) Field of Search ................................. 323/222, 266, 323/267, 271, 272, 282, 283, 285

(56) References Cited

U.S. PATENT DOCUMENTS

| | | | |
|---|---|---|---|
| 5,336,985 A | * 8/1994 | McKenzie | 323/266 |
| 5,400,239 A | 3/1995 | Caine | 363/67 |
| 5,617,015 A | 4/1997 | Goder et al. | 323/282 |
| 5,751,139 A | 5/1998 | Jordan et al. | 323/222 |
| 5,886,508 A | * 3/1999 | Jutras | 323/267 |
| 5,896,284 A | 4/1999 | Murasato et al. | 363/124 |
| 6,157,177 A | * 12/2000 | Feldtkeller | 323/267 |
| 6,222,352 B1 | * 4/2001 | Lenk | 323/267 |
| 6,437,545 B2 | * 8/2002 | Sluijs | 323/222 |
| 6,522,110 B1 | * 2/2003 | Ivanov | 323/267 |
| 6,600,300 B2 | * 7/2003 | Groeneveld et al. | 323/282 |
| 6,636,022 B2 | * 10/2003 | Sluijs | 323/222 |
| 6,737,838 B2 | * 5/2004 | Sluijs et al. | 323/225 |
| 6,798,177 B1 | * 9/2004 | Liu et al. | 323/222 |

FOREIGN PATENT DOCUMENTS

| | | | |
|---|---|---|---|
| JP | 59-169360 | 9/1984 | H02M/3/155 |
| JP | HEI 7-40785 | 5/1995 | H02M/3/28 |
| JP | 09-056150 | 2/1997 | H02M/3/155 |
| JP | 10-262366 | 9/1998 | H02M/3/155 |

* cited by examiner

*Primary Examiner*—Jeffrey Sterrett
(74) *Attorney, Agent, or Firm*—Sheridan Ross P.C.

(57) ABSTRACT

In order to supply controlled DC voltages to a plurality of loads at high efficiency by using smaller number of components, a multiple output DC-DC converter in accordance with the present invention comprises a first main switch 21, one terminal of which is connected to the negative electrode of an input DC power source 1, a first rectifying means 51 and a first smoothing means 61 connected to the other terminal of the first main switch 21, a second main switch 22, one terminal of which is connected to the positive terminal of the input DC power source 1, a second rectifying means 52 and a second smoothing means 62 connected to the other terminal of the second main switch 22, an inductor 31 connected between the other terminal of the first main switch 21 and the other terminal of the second main switch 22, and a control circuit 81 for driving the respective switches at predetermined ON/OFF period ratios.

18 Claims, 12 Drawing Sheets

MULTIPLE OUTPUT DC-DC CONVERTER FOR PROVIDING CONTROLLED VOLTAGES

TECHNICAL FIELD

The present invention relates to a multiple output DC-DC converter, for use in a power source for driving a liquid crystal panel or the like installed in a portable apparatus, for example, that receives a DC voltage from a battery or the like and supplies controlled DC voltages including negative voltages to a plurality of loads.

BACKGROUND ART

As a prior art relating to a multiple output DC-DC converter that receives a DC voltage and supplies controlled DC voltages to a plurality of loads, a configuration shown in FIG. 13 is available. The prior-art multiple output DC-DC converter shown in FIG. 13 is a power source for driving a liquid crystal panel installed in a portable apparatus. In this multiple output DC-DC converter, an input DC voltage Ei=2.5 to 3.3 V is supplied from a battery serving as an input power source 1; a first output voltage Vout1=3.5 V is output as a source drive voltage; and a second output voltage Vout2=13.5 V and a third output voltage Vout3=−13.5 V are output as positive and negative gate drive voltages. A first converter 100 is provided with a first main switch 102 formed of an N-channel MOSFET, a first inductor 103, a first diode 105 for output (first output diode 105) and a first capacitor 106 for output (first output capacitor 106). A step-up converter for outputting the first output voltage Vout1 from the first output capacitor 106 to a first load 107 is formed by the first converter 100. A first control circuit 108 adjusts the ON/OFF ratio of the first main switch 102 to control the first output voltage Vout1. A second converter 200 is provided with a second main switch 202 formed of an N-channel MOSFET, a second inductor 203, a second diode 205 for output (second output diode 205) and a second capacitor 206 for output (second output capacitor 206). A step-up converter for outputting the second output voltage Vout2 from the second output capacitor 206 to a second load 207 is formed by this second converter 200. A second control circuit 208 adjusts the ON/OFF ratio of the second main switch 202 to control the second output voltage Vout2. A third converter 300 receives the second output voltage Vout2 and is provided with a first switch 301, a second switch 302, a capacitor 303, a first diode 304, a second diode 305 and a third capacitor 306 for output (third output capacitor 306). An inverting-type switched capacitor for outputting the third output voltage Vout3 from the third output capacitor 306 to a third load 307 is formed by this third converter 300. A third control circuit 308 carries out control so as to alternately turn ON and OFF the first switch 301 and the second switch 302.

The operation of the prior-art multiple output DC-DC converter shown in FIG. 13 will be described below briefly. First, in the first converter 100, when the first main switch 102 is ON, the input DC voltage Ei is applied to the first inductor 103. At this time, current flows through the first inductor 103 and magnetic energy is stored. Then, when the first main switch 102 becomes OFF, the magnetic energy stored in the first inductor 103 is released as a current for charging the first output capacitor 106 via the first output diode 105. When it is assumed that the first main switch 102 turns ON/OFF in a constant cycle, the energy being output every cycle via the first inductor 103 becomes larger as the ON period of the first main switch 102 is longer. Accordingly, the first output voltage Vout1 becomes higher as the ON period of the first main switch 102 is longer. In other words, the first control circuit 108 adjusts the ON/OFF period ratio of the first main switch 102, whereby the first output voltage Vout1 is controlled. Similarly, in the second converter 200, the control circuit 208 adjusts the ON/OFF period ratio of the second main switch 202, whereby the magnetic energy stored in the second inductor 203 is released as a current for charging the second output capacitor 206 via the second output diode 205. The release amount of this magnetic energy is adjusted, whereby the second output voltage Vout2 is controlled.

In the third converter 300, when the first switch 301 is ON, the second output voltage Vout charges the capacitor 303 via the second diode 305. When the second switch 302 is ON, the energy of the capacitor 303 charges the third output capacitor 306 via the first diode 304, whereby the third output voltage Vout3, obtained by inverting the second output voltage Vout2 to its negative side, is output.

In the above-mentioned configuration, in order to output three kinds of different voltages, three converters are required. However, in portable apparatuses, the number of components is requested to be made smaller, even a single component, in order to attain miniaturization and weight reduction. As means for controlling a plurality of outputs by using smaller number of components, an art described in Japanese Patent Examined Publication No. Hei 7-40785 is available, for example. FIG. 14 is a circuit diagram of a step-up converter having three outputs disclosed in FIG. 1 of Japanese Patent Examined Publication No. Hei 7-40785. In FIG. 14, magnetic energy from an input DC power source V11 is stored while a switch S1 is in contact with a contact 1. The magnetic energy is released to the output side while the switch S1 is in contact with a contact 2. At that time, the magnetic energy is distributed to each output by a switch S2. The invention disclosed in Japanese Patent Examined Publication No. Hei 7-40785 indicates a method for stabilizing the output of each output by controlling the ON period in which the switch S2 is in contact with each contact and for controlling the switch S1 so that electricity is supplied to all loads just sufficiently.

Japanese Patent Examined Publication No. Hei 7-40785 discloses a system wherein the contacts of the switch S2 are switched by time-sharing the period in which the switch S1 is in contact with the contact 2 (the OFF period of the main switch). Although being different in circuit configuration from this prior art, an invention relating to a different control method configured on the basis of a similar technical concept is known. For example, the specification of U.S. Pat. No. 5,400,239 discloses an insulation-type flyback converter having N outputs. In this insulation-type flyback converter, N rectifying and smoothing circuits are connected to one output winding of a transformer via a switch corresponding to the switch S2. Furthermore, the switching frequency of the main switch is divided by N and assigned to the control of each output. In other words, when this insulation-type flyback converter is replaced with the configuration shown in FIG. 14, the switch S2 is switched in accordance with a 1/N switching frequency, and the ON period of the switch S1 is adjusted every switching cycle, whereby each output voltage is controlled.

In addition, the specification of U.S. Pat. No. 5,751,139 discloses a multiple output non-insulation-type DC-DC converter provided with one inductor. In this non-insulation-type DC-DC converter, priority is given to outputs desired to be stabilized. When the configuration of this non-insulationtype DC-DC converter is replaced with the configuration shown in FIG. 14, the switch S2 selects outputs in accordance with order of priority and supplies electricity; when the voltage of a selected output reaches its upper limit threshold value, switching is carried out to select the output having the next order of priority.

As described above, in the prior-art apparatuses, the output of a single DC-DC converter is time-shared so as to be supplied to a plurality of outputs, and a main switch and an output selection switch are controlled to stabilize each output. When this kind of technology is applied to the prior-art multiple output converter shown in FIG. 13, it is necessary to use an output selection switch corresponding to the switch S2 (FIG. 14). However, in the first converter 100 and the second converter 200, the first main switch 102 can be used as the second main switch 202, and the first inductor 103 can be used as the second inductor 203, whereby one inductor, being large in volume among the components, can be eliminated.

As described above, in order to control the three outputs, that is, the first to third output voltages, the prior-art multiple output DC-DC converter comprises two step-up converters and one inverting-type switched capacitor. However, in portable apparatuses desired for miniaturization and weight reduction, in particular, the number of components is requested to be made smaller. In the prior-art technology, in order to control the plurality of outputs by using smaller number of components, it is possible to reduce one inductor by integrating the two step-up converters into one. However, in order to generate a negative output voltage, the inverting-type switched capacitor shown in FIG. 13 is required. It is difficult to finely adjust the output voltage by using this inverting-type switched capacitor. Furthermore, since the capacitor charging and discharging currents are surge currents, problems due to switching noise and switching loss are caused. It is considered to install an inverting converter as a method for obtaining any given negative output voltage; however, an inductor becomes necessary instead of the capacitor used for the inverting-type switched capacitor. Since this kind of inductor is large in volume among the components of the converter, apparatus miniaturization and weight reduction are obstructed.

The present invention is intended to provide a single DC-DC converter capable of outputting a plurality of voltages stepped up from an input voltage and having the same polarity as that of the input voltage or having the opposite polarity, in other words, a multiple output DC-DC converter capable of controlling a plurality of outputs by using one inductor. The present invention provides a multiple output DC-DC converter capable of reducing the number of components and miniaturizing the entire size of the circuit.

DISCLOSURE OF INVENTION

In order to attain the above-mentioned objects, the multiple output DC-DC converter in accordance with the present invention comprises:

one inductor, an input DC power source for outputting an input voltage, a main switch circuit, having an ON state, a first OFF state and a second OFF state, for applying the above-mentioned input voltage to the above-mentioned inductor at the time of the above-mentioned ON state, a step-up rectifying and smoothing circuit, connected to one terminal of the above-mentioned inductor, for rectifying and smoothing a voltage generating in the above-mentioned inductor at the time of the above-mentioned first OFF state and for outputting a stepped-up output voltage obtained by stepping up the above-mentioned input voltage, and an inverting rectifying and smoothing circuit, connected to the other terminal of the above-mentioned inductor, for rectifying and smoothing a voltage generating in the above-mentioned inductor at the time of the above-mentioned second OFF state and for outputting an inverted output voltage obtained by inverting and stepping up or down the above-mentioned input voltage. The multiple output DC-DC converter in accordance with the present invention configured as described above is a single DC-DC converter capable of outputting a plurality of voltages stepped up from the input voltage and having the same polarity as that of the input voltage or a plurality of voltages having the opposite polarity; in other words, a plurality of outputs can be controlled by using one inductor, whereby the reduction of the number of components and the miniaturization of the entire circuit can be attained.

Furthermore, in the multiple output DC-DC converter in accordance with the present invention, the above-mentioned main switch comprises:

a first main switch connected between one terminal of said inductor and the negative electrode of the above-mentioned input DC power source, and a second main switch connected between the other terminal of said inductor and the positive electrode of the above-mentioned input DC power source, and control is carried out so that the ON state of the above-mentioned main switch circuit is a state in which both the above-mentioned first main switch and the above-mentioned second main switch are ON; the above-mentioned first OFF state is a state in which the above-mentioned first main switch is OFF and the above-mentioned second main switch is ON; and the above-mentioned second OFF state is a state in which the above-mentioned first main switch is ON and the above-mentioned second main switch is OFF.

A multiple output DC-DC converter in accordance with another aspect of the present invention comprises:

a main switch circuit, operating in a predetermined switching cycle, for applying an input voltage from an input DC power source to at least one inductor only in a predetermined ON period within the above-mentioned switching cycle, one or more stepped-up output voltage generating means for obtaining stepped-up output voltages rectified and smoothened so that a flyback voltage generating in the above-mentioned inductor after the above-mentioned predetermined ON period within the predetermined switching cycle is applied to the above-mentioned input DC power source, and one or more inverted output voltage generating means for obtaining inverted output voltages rectified and smoothened so as to have negative potentials with respect to the above-mentioned input DC voltage, wherein the above-mentioned switching cycle is assigned to a period in which one of the above-mentioned output voltages is controlled, means for obtaining the above-mentioned output voltage is selected, and the above-mentioned predetermined ON period is adjusted to control the selected output voltage. The multiple output DC-DC converter in accordance with the present invention configured as described above can output a plurality of voltages stepped up from the input voltage and having the same polarity as that of the input voltage and a plurality of voltages having the opposite polarity, whereby the reduction of the number of components and the miniaturization of the entire circuit can be attained.

A multiple output DC-DC converter in accordance with still another aspect of the present invention comprises:

an input DC power source, a step-up rectifying and smoothing circuit having a first main switch, one terminal of which is connected to the negative electrode of the above-mentioned input DC power source, and a series circuit of rectifying means and smoothing means, an inverting rectifying and smoothing circuit having a second main switch, one terminal of which is connected to the positive electrode of the above-mentioned input DC power source, and a series circuit of rectifying means and smoothing means, and at least one inductor connected between the other terminal of the above-mentioned first main switch and the other terminal of the above-mentioned second main switch. The multiple output DC-DC converter in accordance with the present invention configured as described above can output a plurality of voltages stepped up from the input voltage and having the same polarity as that of the input voltage and a plurality of voltages having the opposite polarity, whereby the reduction of the number of components and the miniaturization of the entire circuit can be attained.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the drawings are schematic representations for purposes of illustration and do not necessarily depict the actual relative sizes or locations of the elements shown.

BEST MODE FOR CARRYING OUT THE INVENTION

Preferred embodiments of a multiple output DC-DC converter in accordance with the present invention will be described below referring to the accompanying drawings.

<<Embodiment 1>>

Figure 1:
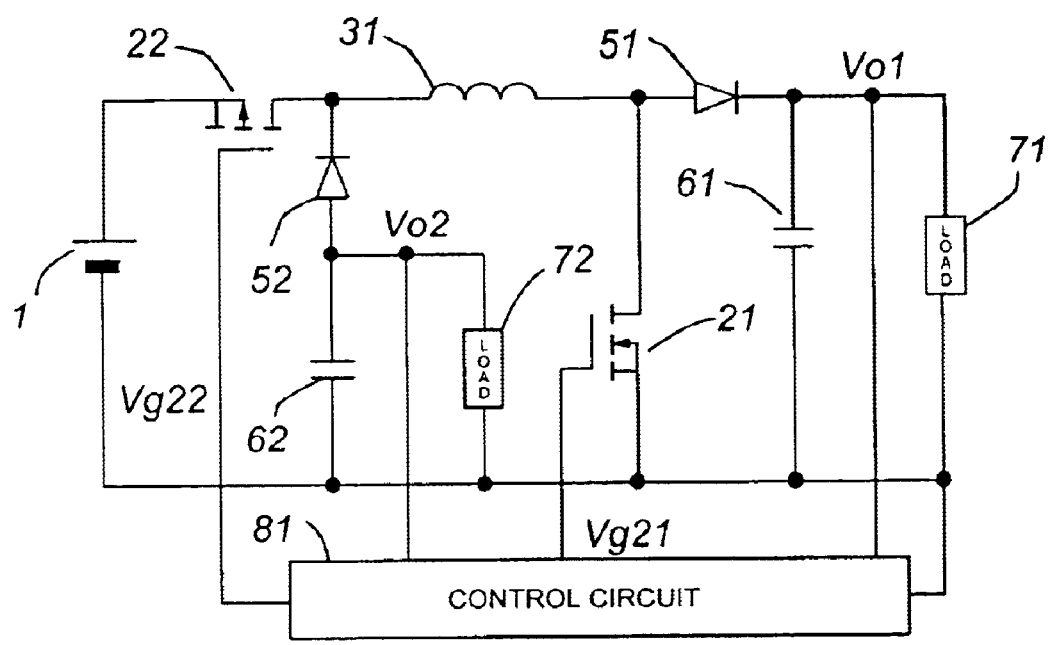
FIG. 1 is a circuit diagram showing a configuration of a multiple output DC-DC converter in accordance with Embodiment 1 of the present invention.

FIG. 1 is a circuit diagram showing a configuration of a multiple output DC-DC converter in accordance with Embodiment 1 of the present invention. As shown in FIG. 1, the multiple output DC-DC converter in accordance with Embodiment 1 of the present invention is connected to an input DC power source 1 and receives an input DC voltage Ei. The multiple output DC-DC converter in accordance with Embodiment 1 is provided with a first main switch 21 formed of an N-channel MOSFET, a second main switch 22 formed of a P-channel MOSFET, an inductor 31, a first rectifying means 51 formed of a diode, a first smoothing means 61 formed of a capacitor, a second rectifying means 52 formed of a diode, a second smoothing means 62 formed of a capacitor, and a control circuit 81 for driving the first main switch 21 and the second main switch 22 in accordance with their respective predetermined ON and OFF periods. A first load 71 is connected across both the terminals of the first smoothing means 61, and a stepped-up output voltage Vo1 is output to the first load 71. A second load 72 is connected across both the terminals of the second smoothing means 62, and an inverted output voltage Vo2 is output to the second load 72. The input and output conditions in Embodiment 1 are represented by Vo1>Ei>0>Vo2. When the second main switch 22 is ON, the first main switch 21, the inductor 31, the first rectifying means 51 and the first smoothing means 61 operate as a step-up converter. On the other hand, when the first main switch 21 is ON, the second main switch 22, the inductor 31, the second rectifying means 52 and the second smoothing means 62 operate as an inverting converter.

Figure 2:
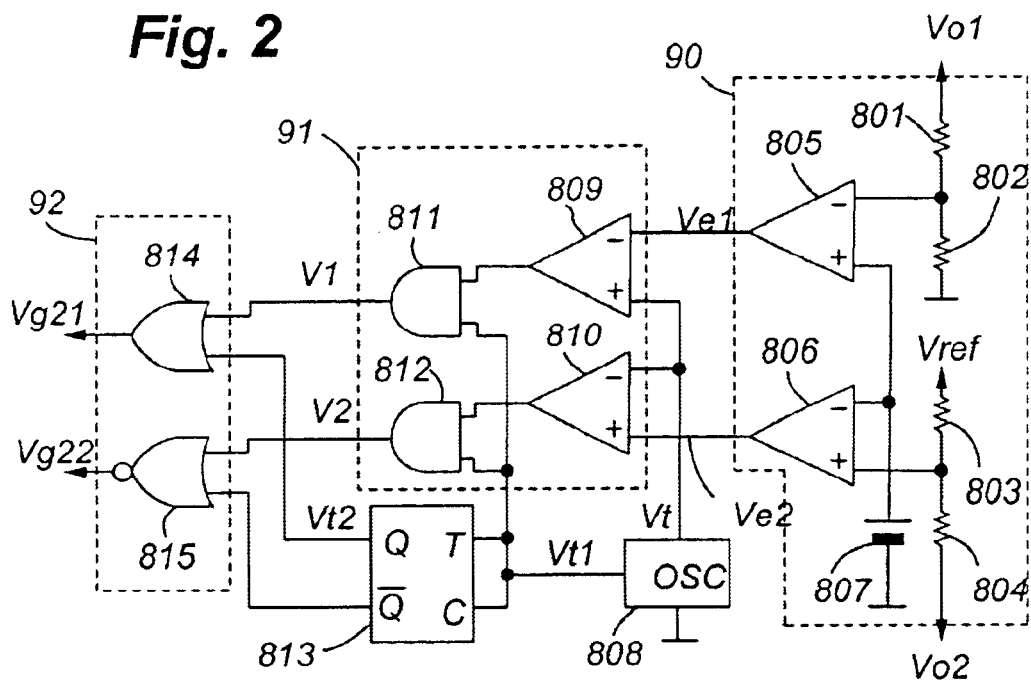
FIG. 2 is a circuit diagram showing the details of a control circuit in the multiple output DC-DC converter in accordance with Embodiment 1 of the present invention.

FIG. 2 is a circuit diagram showing the configuration of the control circuit 81 in greater detail. In FIG. 2, a resistor 801 and a resistor 802 detect the stepped-up output voltage Vo1, and a resistor 803 and a resistor 804 detect the inverted output voltage Vo2. The detected voltages are compared with the reference voltage of a reference voltage source 807 by an error amplifier 805 and an error amplifier 806, respectively, whereby an error signal Ve1 for stepped-up output (stepped-up output error signal Ve1) and an error signal Ve2 for inverted output (inverted output error signal Ve2) are output, respectively. The resistors 801 to 804, the error amplifier 805, the error amplifier 806 and the reference voltage source 807 constitute a detection circuit 90. An oscillation circuit 808 outputs a triangular wave voltage Vt having a potential increasing or decreasing in a predetermined cycle, and a signal Vt1 that becomes "H" when the triangular wave voltage Vt increases and that becomes "L" when the voltage decreases. A comparator 809 compares the stepped-up output error signal Ve1 with the triangular wave voltage Vt. A comparator 810 compares the inverted output error signal Ve2 with the triangular wave voltage Vt. The output signals of the comparators 809 and 810 are output as a signal V1 and a signal V2 indicating ANDs with the signal Vt1 by using AND circuits 811 and 812, respectively. The signal V1 is a pulse signal for stepped-up output (stepped-up output pulse signal), and the signal V2 is a pulse signal for inverted output (inverted output pulse signal). The comparators 809 and 810 and the AND circuits 811 and 812 constitute a PWM circuit 91. A T flip-flop 813 serving as a frequency division circuit receives the signal Vt1 and outputs a signal Vt2. An OR circuit 814 receives the signal V1 and the signal Vt2 and outputs a drive signal Vg21. The drive signal Vg21 drives the first main switch 21 formed of an N-channel MOSFET and turns ON the first main switch 21 when the signal is "H." A NOR circuit 815 receives the signal V2 and the inverted signal of the signal Vt2 and outputs a drive signal Vg22. The drive signal Vg22 drives the second main switch 22 formed of a P-channel MOSFET and turns ON the second main switch 22 when the signal is "L." In Embodiment 1, the drive signal Vg21 and the drive signal Vg22 are main switch drive signals. The OR circuit 814 and the NOR circuit 815 constitute a logic circuit 92.

Figure 3:
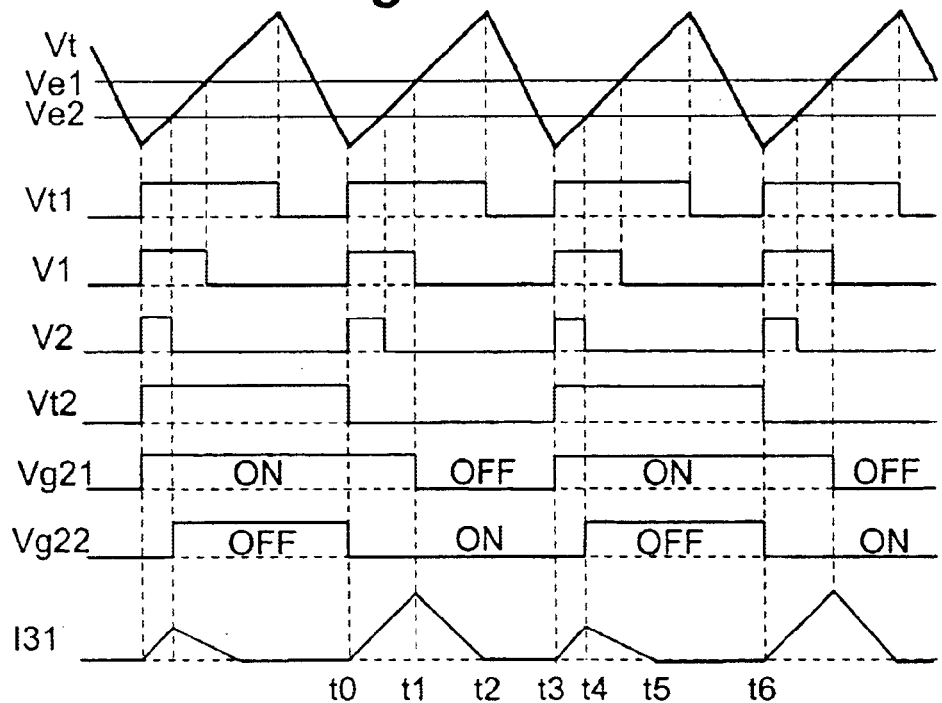
FIG. 3 is a waveform diagram showing the operation of the control circuit in the multiple output DC-DC converter in accordance with Embodiment 1 of the present invention.

FIG. 3 is a waveform diagram showing the above-mentioned respective signals and a current I31 flowing through the inductor 31. The operation of the multiple output DC-DC converter in accordance with Embodiment 1 of the present invention will be described below by using FIG. 1 to FIG. 3.

At time t0 of FIG. 3, the triangular wave signal Vt starts rising, the signal Vt1 becomes "H," and the signal Vt2, that is, the output of the T flip-flop 813 to which the signal Vt1 is input, becomes "L." On the other hand, the signal V1 indicating the AND of the signal Vt and the result of the comparison between the triangular wave signal Vt and the error signal Ve1 becomes "H." In addition, the drive signal Vg21, that is, the AND of the signal V1 and the signal Vt2 becomes "H." In other words, the first main switch 21 becomes ON. On the other hand, the inverted signal of the signal Vt2 is "H," and the drive signal Vg22, that is, the output of the NOR circuit 815 to which this inverted signal is input, becomes "L." In other words, the second main switch 22 becomes ON. At this time, the input DC voltage Ei is applied to the inductor 31, whereby magnetic energy is stored.

When the comparator 809 is inverted and the signal V1 becomes "L" at time t1, since the signal Vt2 is "L," the drive signal Vg21 become "L." As a result, the first main switch 21 becomes OFF. On the other hand, since the drive signal Vg22 remains "L," the second main switch 22 is ON. At this time, the magnetic energy stored in the inductor 31 is released as a current for charging the capacitor serving as the first smoothing means 61 from the input DC voltage source 1 via the first rectifying means 51. Then, at time t2, this current becomes zero. On the other hand, the triangular wave voltage Vt turns from rising to lowering, and the signal Vt1 becomes "L" simultaneously.

Next, at time t3, the triangular wave signal Vt starts rising, the signal Vt1 becomes "H" again, and the output signal Vt2 of the T flip-flop 813 becomes "H." Hence, the drive signal Vg21, that is, the output of the OR circuit 814 to which the signal Vt2 is input, becomes "H." In other words, the first main switch 21 becomes ON. In addition, the signal V2, that is, the AND of the signal Vt and the result of the comparison between the triangular wave signal Vt and the error signal Ve2 becomes "H," and the drive signal Vg22, that is, the output of the NOR circuit 815 to which the signal V2 is input, becomes "L." In other words, the second main switch 22 becomes ON. At this time, the input DC voltage Ei is applied to the inductor 31, whereby magnetic energy is stored.

When the comparator 810 is inverted and the signal V2 becomes "L" at time t4, since the inverted signal of the signal Vt2 is "L," the drive signal Vg22, that is, the output of the NOR circuit 815 to which the signal V2 and the signal Vt2 are input, becomes "H." In other words, the second main switch 22 becomes OFF. In addition, the drive signal Vg21, that is, the output of the OR circuit 814, is "H" since the signal Vt2, an H-level signal, is input. At this time, the first main switch. 21 remains ON. At this time, the magnetic energy stored in the inductor 31 is released as a current for charging the capacitor serving as the second smoothing means 62 via the second rectifying means 52. Then, at time t5, this current becomes zero. On the other hand, the triangular wave voltage Vt turns from rising to lowering, and the signal Vt1 becomes "L" simultaneously.

At time t6, the triangular wave signal Vt turns to rising, whereby the signal Vt1 becomes "H" again, the signal Vt2 becomes "L," and the operation after time t0 is repeated.

When it is assumed that the inductance of the inductor 31 is L, that the oscillation cycle of the oscillator 808 is T, that the period between time t0 and t1 in which both the first main switch 21 and the second main switch 22 are ON is Ton1, that the period between time t3 and t4 is Ton2 similarly, that the output current to the first load 71 is Io1, and that the output current to the second load 72 is Io2, the relationships of the following equations (1) and (2) are established.

$$Vo1 = Ei + (Ei \cdot Ton1)^2 / (4L \cdot T \cdot Io1) \qquad (1)$$

$$Vo2 = -(Ei \cdot Ton2)^2 / (4L \cdot T \cdot Io2) \qquad (2)$$

The error signals Ve1 and Ve2 increase or decrease so that the stepped-up output voltage Vo1 and the inverted output voltage Vo2 are stabilized to desired voltages, whereby the periods in which both the first main switch 21 and the second main switch 22 are ON are adjusted. In other words, the step-up converter and the inverting converter, in which the inductor 31 is shared, undergo time-shared control at half the oscillation frequency of the oscillator 808, whereby the stepped-up output voltage Vo1 and the inverted output voltage Vo2 are stabilized to the desired voltages.

As described above, with the multiple output DC-DC converter in accordance with Embodiment 1, it is possible to obtain an effect of being capable of simultaneously stabilizing the stepped-up output and the inverted output by using a smaller number of components attained by sharing the single inductor 31.

<<Embodiment 2>>

Figure 4:
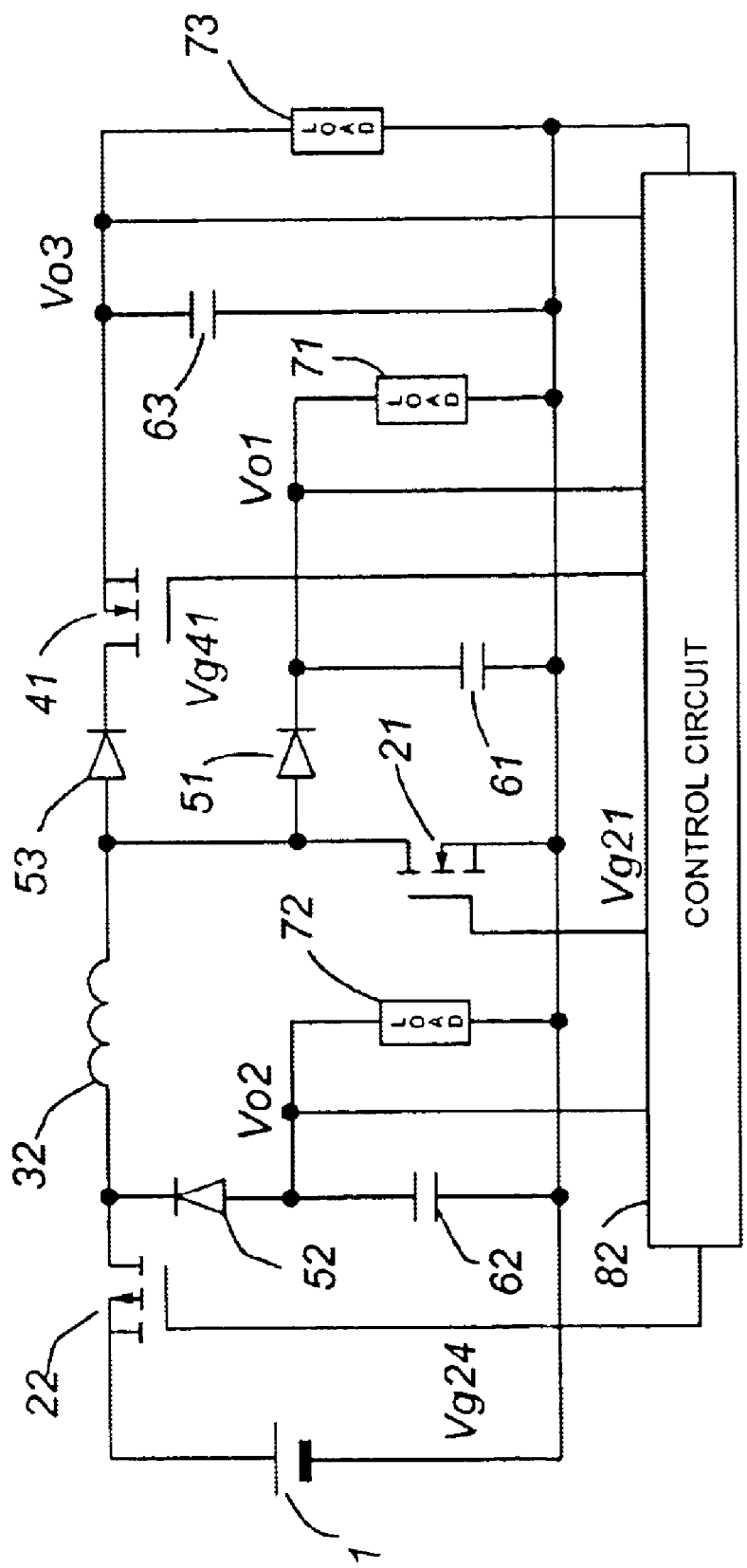
FIG. 4 is a circuit diagram showing a configuration of a multiple output DC-DC converter in accordance with Embodiment 2 of the present invention.

FIG. 4 is a circuit diagram showing the configuration of a multiple output DC-DC converter in accordance with Embodiment 2 of the present invention. In the multiple output DC-DC converter in accordance with Embodiment 2, components similar to those of the configuration of the multiple output DC-DC converter in accordance with Embodiment 1 shown in FIG. 1 are designated by the same numerals. Embodiment 2 differs from the configuration of the DC-DC converter in accordance with Embodiment 1 shown in FIG. 1 in that the stepped-up output voltage Vo1 output from the first smoothing means is a first stepped-up output voltage, that a series circuit of an auxiliary switch 41 formed of an N-channel MOSFET and a third rectifying means 53 formed of a diode is provided, and that a third smoothing means 63 formed of a capacitor is provided. In addition, this embodiment also differs in that a second stepped-up output voltage Vo3 is added and output to a third load 73.

Figure 5:
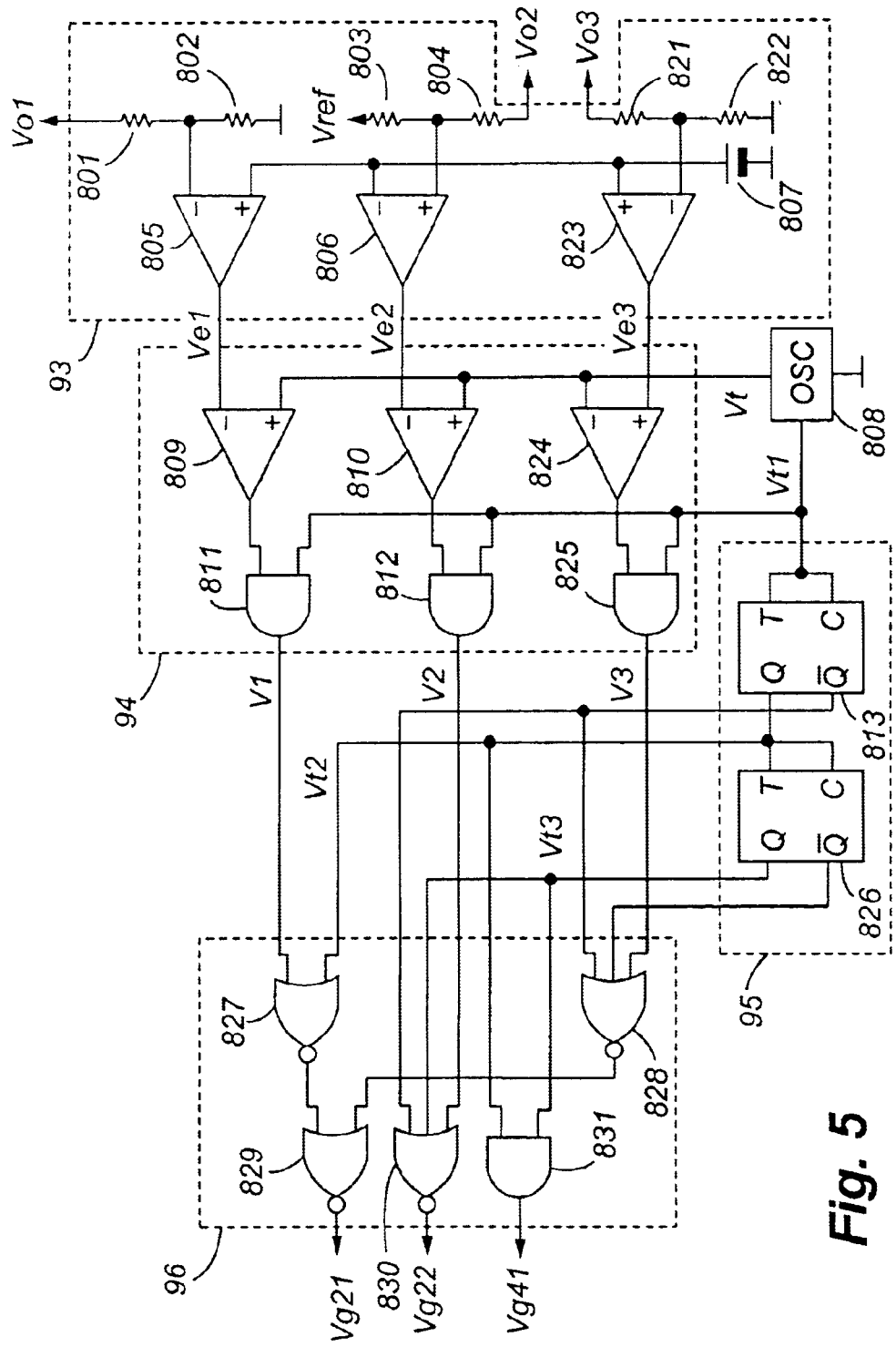
FIG. 5 is a circuit diagram showing the details of a control circuit in the multiple output DC-DC converter in accordance with Embodiment 2 of the present invention.

In Embodiment 2, in order to control the second stepped-up output voltage Vo3, functions for the purpose are additionally provided for a control circuit 82, whereby the circuit configuration shown in FIG. 5 is obtained. The input and output conditions in Embodiment 2 are represented by Vo1>Vo3>Ei>0>Vo2.

FIG. 5 is a circuit diagram showing the configuration of the control circuit 82 in accordance with Embodiment 2 in greater detail. Referring to FIG. 5, differences from the configuration of Embodiment 1 shown in FIG. 2 will be described below.

As shown in FIG. 5, a detection circuit 93 in accordance with Embodiment 2 is additionally provided with, in addition to the configuration of the detection circuit 90 of FIG. 2, a resistor 821 and a resistor 822 for detecting the second stepped-up output voltage Vo3, and an error amplifier 823 for comparing the detected voltage with the reference voltage of the reference voltage source 807. A PWM circuit 94 in accordance with Embodiment 2 is additionally provided with, in addition to the configuration of the PWM circuit 91 of FIG. 2, a comparator 824 for comparing an error signal Ve3 for stepped-up output (stepped-up output error signal Ve3), that is, the output of the error amplifier 823, with the triangular wave voltage Vt, and an AND circuit 825 for outputting a signal V3 indicating the AND of the output signal of the comparator 824 and the signal Vt1. A frequency division circuit 95 in accordance with Embodiment 2 is additionally provided with, in addition to the T flip-flop 813 for receiving the signal Vt1 and outputting the signal Vt2, a second T flip-flop 826 for receiving the signal Vt2. A logic circuit 96 in accordance with Embodiment 2 is additionally provided with, in addition to the configuration of the logic circuit 92 of FIG. 2, a NOR circuit 827 for receiving the signal V1 and the signal Vt2 and a NOR circuit 828 for receiving the signal V3, the inverted signal of the signal Vt2 and the inverted signal of the output Vt3 of the second T flip-flop 826.

Furthermore, in Embodiment 2, instead of the OR circuit 814 shown in FIG. 2, a NOR circuit 829 for outputting the drive signal Vg21 is provided; this NOR circuit 829 is configured so as to receive the output of the NOR circuit 827 and the output of the NOR circuit 828. Moreover, in Embodiment 2, instead of the NOR circuit 815 of FIG. 2, a NOR circuit 830 for outputting the drive signal Vg22 is provided; this NOR circuit 830 is configured so as to receive the signal V2, the inverted signal of the signal Vt2 and the signal Vt3. Still further, in Embodiment 2, an AND circuit 831 for outputting a stepped-up output auxiliary switch drive signal Vg41, that is, the AND of the signal Vt2 and the signal Vt3, is provided. The stepped-up output auxiliary switch drive signal Vg41 turns ON/OFF the auxiliary switch 41. The logic circuit 96 in accordance with Embodiment 2 comprises the NOR circuits 827 to 830 and the AND circuit 831.

Figure 6:
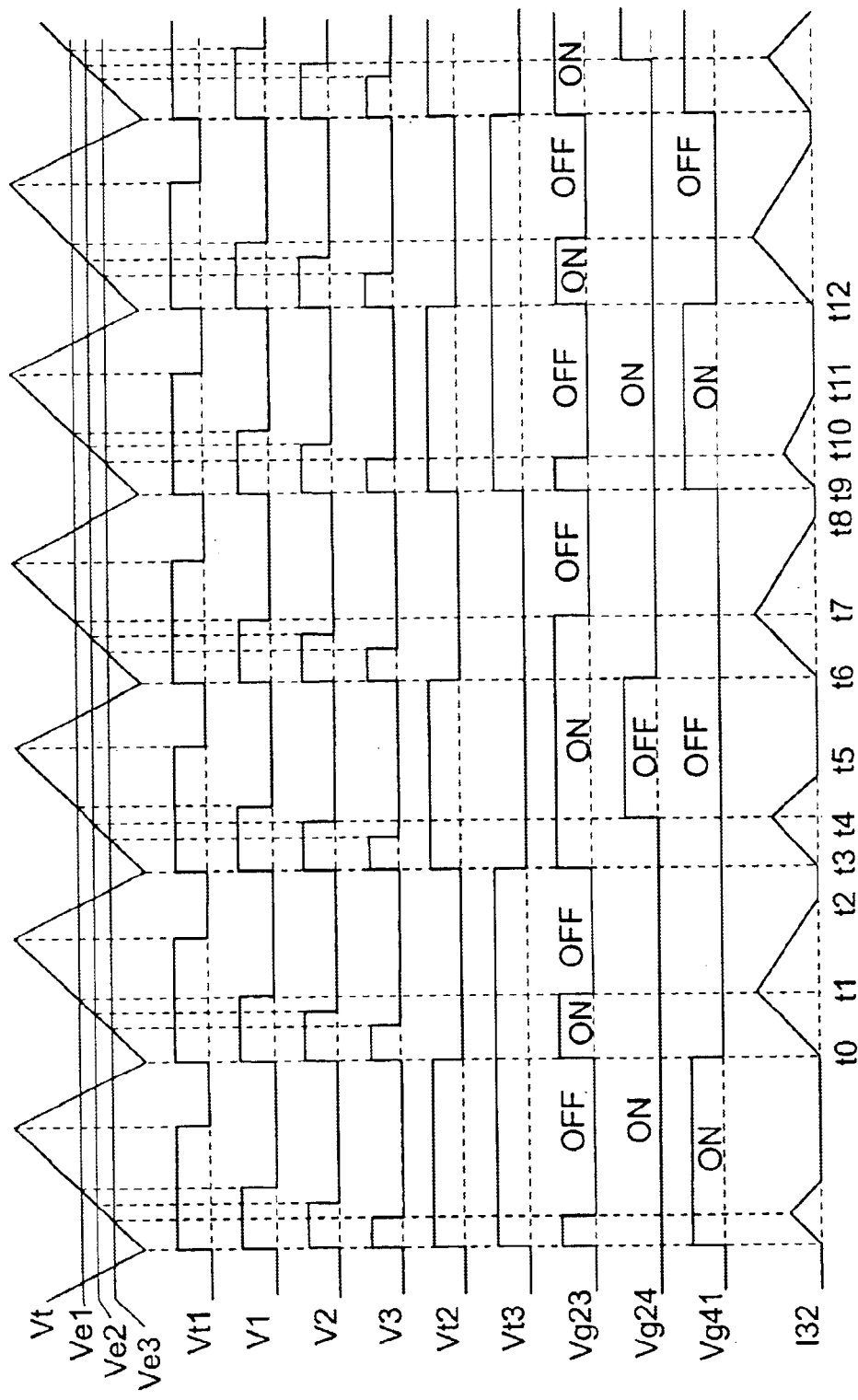
FIG. 6 is a waveform diagram showing the operation of the control circuit in the multiple output DC-DC converter in accordance with Embodiment 2 of the present invention.

FIG. 6 is a waveform diagram showing the above-mentioned respective signals and a current I32 flowing through an inductor 32. The operation of the multiple output DC-DC converter in accordance with Embodiment 2 of the present invention will be described below by using FIG. 4 to FIG. 6.

At time t0 of FIG. 6, the triangular wave signal Vt starts rising, the signal Vt1 becomes "H," and the output Vt2 of the T flip-flop 813 to which the signal Vt1 is input, becomes "L." Furthermore, the output Vt3 of the T flip-flop 826 to which the signal Vt2 is input, remains "H." Hence, the drive signal Vg41, that is, the AND of the signal Vt2 and the signal Vt3, becomes "L," whereby the auxiliary switch 41 is OFF. In addition, the drive signal Vg22, that is, the output of the NOR circuit 830 that includes the signal Vt3 as an input becomes "L," whereby the second main switch 22 is ON. On the one hand, the signal V1 becomes "H," whereby the output of the NOR circuit 827 to which the signal V1 is input becomes "L." Furthermore, the output of the NOR circuit 828 to which the inverted signal of the signal Vt2 is input also becomes "L." As a result, the drive signal Vg21, that is, the output of the NOR circuit 829, becomes "H." In other words, the first main switch 21 becomes ON. At this time, the input DC voltage Ei is applied to the inductor 32, whereby magnetic energy is stored.

When the signal V1 becomes "L" at time t1, since the signal Vt2 is "L," the output of the NOR circuit 827 becomes "H." Hence, the output of the NOR circuit 829 to which the output of the NOR circuit 827 is input, that is, the drive signal Vg21, becomes "L." As a result, the first main switch 21 becomes OFF. On the other hand, since the signal Vt2 remains "L" and the signal Vt3 remains "H," the drive signal Vg22 remains "L" and the drive signal Vg41 remains "L." The second main switch 22 is ON and the auxiliary switch 41 is OFF. At this time, since the auxiliary switch 41 is OFF, the magnetic energy stored in the inductor 32 is released as a current for charging the capacitor serving as the first smoothing means 61 via the first rectifying means 51. Then, at time t2, this current I32 flowing through the inductor 32 becomes zero. As shown in FIG. 6, until up to time t3, the triangular wave voltage Vt turns from rising to lowering, and the signal Vt1 becomes "L" simultaneously at that time.

At time t3, the triangular wave signal Vt turns to rising, the signal Vt1 becomes "H" again, the signal Vt2 becomes "H," and the signal Vt3 becomes "L." Hence, the output of the NOR circuit 827 to which the signal Vt2 is input, becomes "L," and the output of the NOR circuit 828 to which the inverted signal of the signal Vt3 is input also becomes "L." Thus, the output of the NOR circuit 829, that is, the drive signal Vg21, becomes "H," whereby the first main switch 21 becomes ON. At this time, the signal V2 indicating the AND of the signal Vt and the result of the comparison between the triangular wave signal Vt and the error signal Ve3 becomes "H," and the output of the NOR circuit 830 to which the signal V2 is input, also becomes "H," whereby the drive signal Vg22 is "L." In other words, the second main switch 22 is ON. Furthermore, since the drive signal Vg41, that is, the AND of the signal Vt2 and the signal Vt3, is "L," the auxiliary switch 41 remains OFF. At this time, the input DC voltage Ei is applied to the inductor 32, whereby magnetic energy is stored.

At time t4, the comparator 810 is inverted, and the signal V2 becomes "L," whereby all the inputs of the NOR circuit 830 become "L." Hence, the drive signal Vg22, that is, the output of the NOR circuit 830, becomes "H." As a result, the second main switch 22 becomes OFF. Since the signal Vt2 remains "H" and the signal Vt3 remains "L," the drive signal Vg21 remains "H" and the drive signal Vg41 remains "L." Hence, the first main switch 21 is ON and the auxiliary switch 41 is OFF. At this time, the magnetic energy stored in the inductor 32 is released as a current for charging the capacitor serving as the second smoothing means 62 via the second rectifying means 52. Then, at time t5, this current I32 flowing through the inductor 32 becomes zero. As shown in FIG. 6, until up to time t6, the triangular wave voltage Vt turns from rising to lowering, and the signal Vt1 becomes "L" simultaneously at that time.

At time t6, the triangular wave signal Vt turns to rising, the signal Vt1 becomes "H" again, the signal Vt2 becomes "L," and the signal Vt3 remains "L." At this time, the drive signal Vg41 is "L," and the auxiliary switch 41 remains OFF. On the other hand, the signal V1 becomes "H," and both the outputs of the NOR circuit 827 and the NOR circuit 828 become "L," whereby the drive signal Vg21 becomes "H" and the first main switch 21 becomes ON. Since the inverted signal of the signal Vt2 becomes "H," the output of the NOR circuit 830 to which this inverted signal is input, becomes "L." In other words, since the drive signal Vg22 becomes "L," the second main switch 22 becomes ON. At this time, the input DC voltage Ei is applied to the inductor 32, whereby magnetic energy is stored.

When the signal V1 becomes "L" at time t7, the output of the NOR circuit 827 becomes "H." Hence, the output of the NOR circuit 829 to which the signal from the NOR circuit 827 is input, that is, the drive signal Vg21 becomes "L." As a result, the first main switch 21 becomes OFF. On the other hand, since the signal Vt2 remains "L" and the signal Vt3 remains "L," the drive signal Vg22 remains "L" and the drive signal Vg41 remains "L." The second main switch 22 is ON and the auxiliary switch 41 is OFF. At this time, since the auxiliary switch 41 is OFF, the magnetic energy stored in the inductor 32 is released as a current for charging the capacitor serving as the first smoothing means 61 via the first rectifying means 51. Then, at time t8, the current I32 flowing through the inductor 32 becomes zero. As shown in FIG. 6, until up to time t9, the triangular wave voltage Vt turns from rising to lowering, and the signal Vt1 becomes "L" simultaneously at that time.

At time t9, the triangular wave signal Vt turns to rising, the signal Vt1 becomes "H" again, the signal Vt2 becomes "H," and the signal Vt3 also becomes "H." Hence, the drive signal Vg41, that is, the AND of the signal Vt2 and the signal Vt3, becomes "H," whereby the auxiliary switch 41 becomes ON. Furthermore, since the output of the NOR circuit 830 to which the signal Vt3 is input, is "L," the drive signal Vg22 is "L," and the second main switch 22 also remains ON. On the other hand, the signal V3 indicating the AND of the signal Vt and the result of the comparison between the triangular wave signal Vt and the error signal Ve3 becomes "H," and the output of the NOR circuit 828 to which the signal V3 is input, becomes "L." As a result, the drive signal Vg21 becomes "H." In other words, the first main switch 21 becomes ON. At this time, the input DC voltage Ei is applied to the inductor 32, whereby magnetic energy is stored.

At time t10, the comparator 825 is inverted, and the signal V3 becomes "L," whereby all the inputs of the NOR circuit 828 become "L" and its output becomes "H." Hence, the output of the NOR circuit 829, that is, the drive signal Vg21, becomes "L" and the first main switch 21 becomes OFF. On the other hand, since the signal Vt2 remains "H" and the signal Vt3 remains "H," the drive signal Vg22 remains "L" and the drive signal Vg41 remains "H." As a result, the second main switch 22 is ON and the auxiliary switch 41 also remains ON. At this time, since the auxiliary switch 41 is ON, the magnetic energy stored in the inductor 32 is released as a current for charging the capacitor serving as the third smoothing means 63 via the third rectifying means 53. Then, at time t11, this current becomes zero.

On the other hand, the triangular wave voltage Vt turns from rising to lowering, and the signal Vt1 becomes "L" simultaneously. At time t12, the triangular wave signal Vt turns to rising, whereby the signal Vt1 becomes "H" again, the signal Vt2 becomes "L," the signal Vt3 becomes "H," and the operation after time t0 is repeated.

When it is assumed that the inductance of the inductor 32 is L, that the oscillation cycle of the oscillator 808 is T, that the ON period of the first main switch 21 and the second main switch 22, Corresponding to the period in which the signal V1 is "H," just like the period between time t0 and t1 and the period between time t6 and t7 of FIG. 6, is Ton1, that the ON period of the first main switch 21 and the second main switch 22, corresponding to the period in which the signal V2 is "H," just like the period between time t3 and t4, is Ton2, that the ON period of the first main switch 21 and the second main switch 22, in which the auxiliary switch 41 is ON, just like the period between time t9 and t10, is Ton3, that the output current to the first load 71 is Io1, that the output current to the second load 72 is Io2, and that the output current to the third load 73 is Io3, the relationships of the following equations (3), (4) and (5) are established.

$$Vo1=Ei+(Ei\cdot Ton1)^2/(4L\cdot T\cdot Io1) \qquad (3)$$

$$Vo2=-(Ei\cdot Ton2)^2/(8L\cdot T\cdot Io2) \qquad (4)$$

$$Vo3=Ei+(Ei\cdot Ton3)^2/(8L\cdot T\cdot Io3) \qquad (5)$$

The error signals Ve1, Ve2 and Ve3 increase or decrease so that the first stepped-up output voltage Vo1, the inverted output voltage Vo2 and the second stepped-up output voltage Vo3 are stabilized to desired voltages, whereby the ON periods of the first main switch 21 and the second main switch 22 are adjusted. In Embodiment 2, among the two step-up converters and the one inverting converter, in which the inductor 32 is shared, the step-up converter for supplying the first stepped-up output voltage undergoes time-shared control at 2/4 the oscillation frequency of the oscillator 808, and the other step-up converter and the inverting converter undergo timeshared control at 1/4 the oscillation frequency. Hence, the multiple output DC-DC converter in accordance with Embodiment 2 can stabilize the first stepped-up output voltage, the second stepped-up output voltage and the inverted output voltage to the respective desired voltages.

As described above, Embodiment 2 provides the configuration in which the one inverter 32 is shared, whereby it is possible to obtain an excellent effect of being capable of simultaneously stabilizing the two stepped-up outputs and the single inverted output by using a smaller number of components.

In Embodiment 2, the step-up converter for supplying the first stepped-up output voltage undergoes time-shared control at 2/4 the oscillation frequency of the oscillator 808; however, 2/4 the oscillation frequency may be assigned to the step-up converter for supplying the second stepped-up output voltage, and the other converters may undergo time-shared control at 1/4 the oscillation frequency. In determining which converter is selected as a converter to which 2/4 the oscillation frequency is assigned, the converter having larger output power should be selected; the selection is possible as desired depending on the logic circuit constituting the control circuit.

<<Embodiment 3>>

Figure 7:
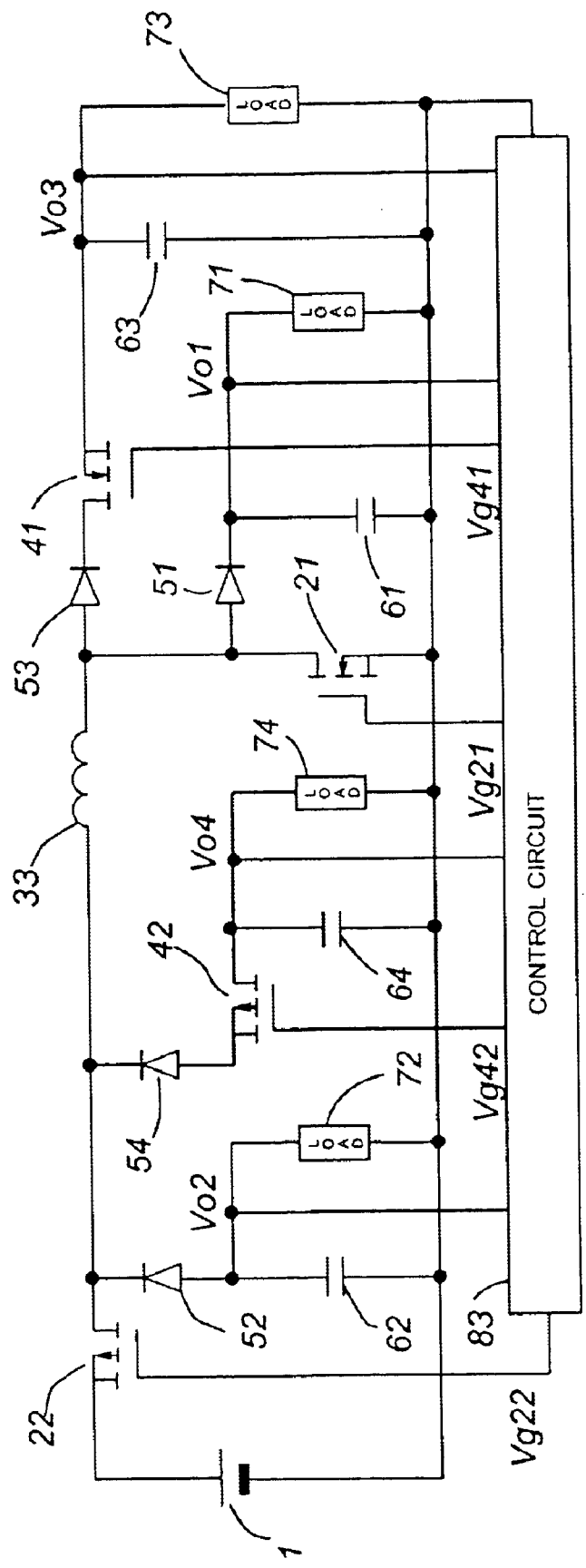
FIG. 7 is a circuit diagram showing a configuration of a multiple output DC-DC converter in accordance with Embodiment 3 of the present invention.
Figure 8:
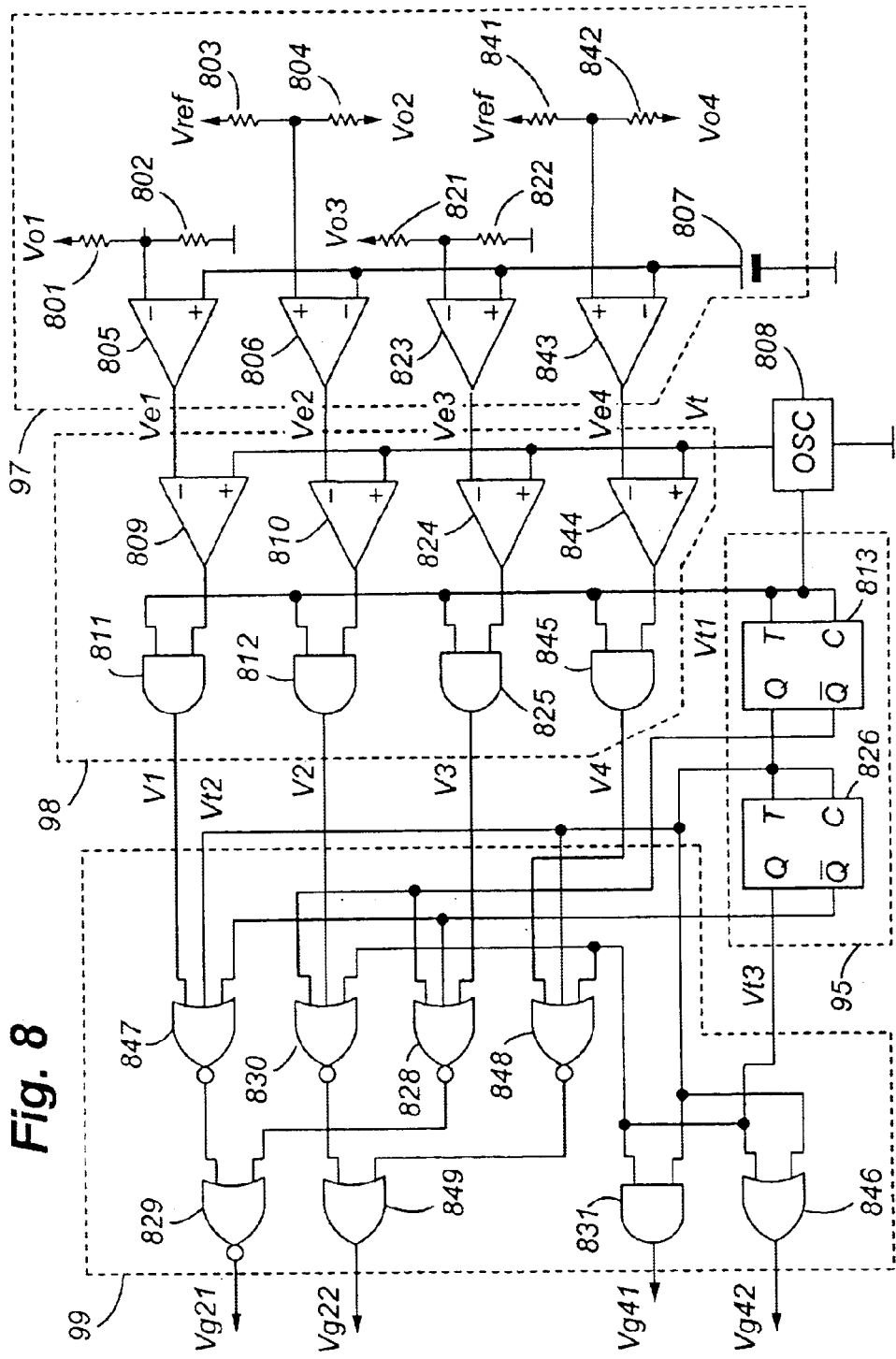
FIG. 8 is a circuit diagram showing the details of a control circuit in the multiple output DC-DC converter in accordance with Embodiment 3 of the present invention.

FIG. 7 is a circuit diagram showing the configuration of a multiple output DC-DC converter in accordance with Embodiment 3 of the present invention. In Embodiment 3, components similar to those of the configuration of the multiple output DC-DC converter in accordance with Embodiment 2 described above and shown in FIG. 4 are designated by the same numerals. The multiple output DC-DC converter in accordance with Embodiment 3 differs from the configuration of Embodiment 2 shown in FIG. 4 in that when it is assumed that the inverted output voltage to be supplied to the load 72 is a first inverted output voltage Vo2, a series circuit of a second auxiliary switch 42 formed of a P-channel MOSFET and a fourth rectifying means 54 formed of a diode is provided, that a fourth smoothing means 64 formed of a capacitor is provided, and that a configuration for outputting a second inverted output voltage Vo4 to a fourth load 74 is added. In addition, in order to control the second inverted output voltage Vo4, functions for the purpose are additionally provided for a control circuit 83, whereby the configuration shown in FIG. 8 is obtained. The input and output conditions in Embodiment 3 are represented by Vo1>Vo3>Ei>0>Vo4>Vo2.

FIG. 8 is a circuit diagram showing the configuration of the control circuit 83 in greater detail. Referring to FIG. 8, differences from the configuration of Embodiment 2 shown in FIG. 5 will be described below. A detection circuit 97 in accordance with Embodiment 3 is additionally provided with, in addition to the configuration of the detection circuit 93 shown in FIG. 5, a resistor 841 and a resistor 842 for detecting the second inverted output voltage Vo4, and an error amplifier 843 for comparing the detected voltage with the reference voltage of the reference voltage source 807. A PWM circuit 98 in accordance with Embodiment 3 is additionally provided with, in addition to the configuration of the PWM circuit 94 shown in FIG. 5, a comparator 844 for comparing an error signal Ve4, that is, the output of the error amplifier 824, with the triangular wave voltage Vt, an AND circuit 845 for outputting a signal V4 indicating the AND of the output signal of this comparator 844 and the signal Vt1, an OR circuit 846 to which the signal Vt2 and the signal Vt3 are input, and a NOR circuit 848 to which the signal V4, the signal Vt2 and the signal Vt3 are input. Furthermore, a logic circuit 99 in accordance with Embodiment 3 is provided with, instead of the NOR circuit 827 in the logic circuit 96 shown in FIG. 5, a NOR circuit 847 to which the signal V1, the signal Vt2 and the inverted signal of the signal Vt3 are input and from which the drive signal Vg21 is output to the NOR circuit 829. The NOR circuit 829 for outputting the drive signal Vg21 is configured so as to receive the output of the NOR circuit 847 and the output of the NOR circuit 828. Furthermore, in the logic circuit 99, the output of the NOR circuit 830 is input to the OR circuit 849 together with the output of the NOR circuit 848, and the OR circuit 849 is configured to output the drive signal Vg22. In Embodiment 3, the OR circuit 846 is provided; this OR circuit 846 outputs a drive signal Vg42 thereby to turn ON/OFF the second auxiliary switch 42. In Embodiment 3, the logic circuit 99 comprises the NOR circuits 828 to 830, 847 and 848, the AND circuit 831 and the OR circuits 846 and 849.

Figure 9:
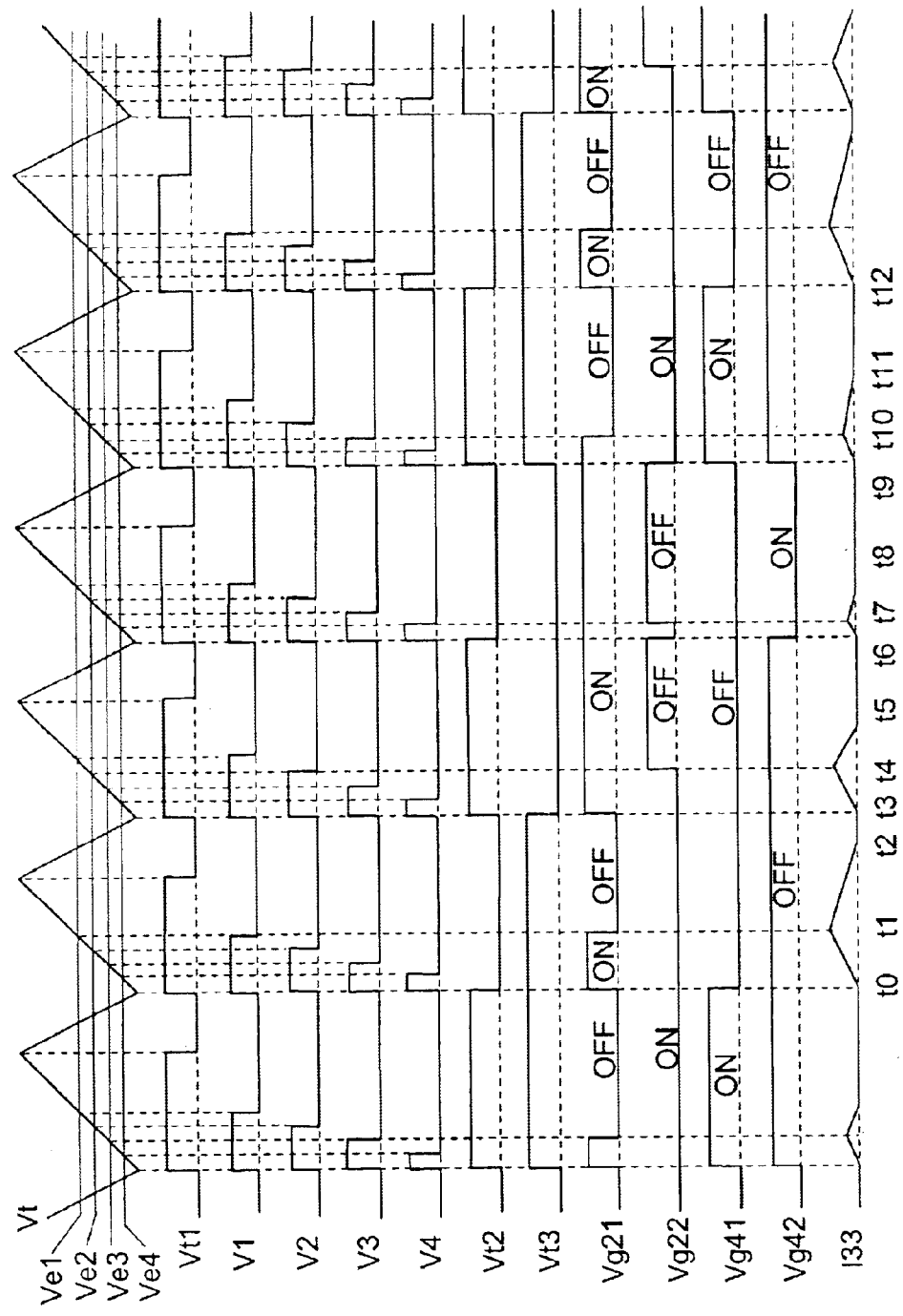
FIG. 9 is a waveform diagram showing the operation of the control circuit in the multiple output DC-DC converter in accordance with Embodiment 3 of the present invention.

FIG. 9 is a waveform diagram showing the above-mentioned respective signals and a current I33 flowing through an inductor 33. The operation of the multiple output DC-DC converter in accordance with Embodiment 3 of the present invention will be described below by using FIG. 7 to FIG. 9.

At time t0 of FIG. 9, the triangular wave signal Vt starts rising, the signal Vt1 becomes "H," and, the output Vt2 of the T flip-flop 813 to which the signal Vt1 is input becomes "L." Furthermore, the output Vt3 of the T flip-flop 826 to which the signal Vt2 is input remains "H." Hence, the drive signal Vg41 becomes "L," whereby the auxiliary switch 41 is OFF. The second drive signal Vg42 becomes "H," whereby the second main switch 42 is OFF. At time t0, the drive signal Vg22, that is, the output of the OR circuit 849, is "L," whereby the second main switch 22 remains ON.

The output of the NOR circuit 847 to which the signal V1 being "H" is input becomes "L." On the other hand, the output of the NOR circuit 828 to which the inverted signal of the signal Vt2 is input also becomes "L." As a result, the drive signal Vg21, that is, the output of the NOR circuit 829, becomes "H." In other words, the first main switch 21 becomes ON. At this time, the input DC voltage Ei is applied to the inductor 33, whereby magnetic energy is stored.

When the signal V1 becomes "L" at time t1, the drive signal Vg21 becomes "L," and the first main switch 21 becomes OFF. On the other hand, since the signal Vt2 remains "L" and the signal Vt3 remains "H," the drive signal Vg22 remains "L," the drive signal Vg41 remains "L," and the drive signal Vg42 remains "H." At this time, since the auxiliary switch 41 is OFF, the magnetic energy stored in the inductor 33 is released as a current for charging the capacitor serving as the first smoothing means 61 via the first rectifying means 51. Then, at time t2, the current I33 flowing through the inductor 33 becomes zero. As shown in FIG. 9, until up to time t3, the triangular wave voltage Vt turns from rising to lowering, and the signal Vt1 becomes "L" simultaneously at that time.

At time t3, the triangular wave signal Vt turns to rising, the signal Vt1 becomes "H" again, the signal Vt2 becomes "H," and the signal Vt3 becomes "L." Hence, the output of the NOR circuit 847 becomes "L," and the output of the NOR circuit 828 also becomes "L." Hence, the drive signal Vg21 becomes "H." whereby the first main switch 21 becomes ON. On the other hand, the signal V2 indicating the AND of the signal Vt1 and the result of the comparison between the triangular wave signal Vt and the error signal Ve2 becomes "H," and the output of the NOR circuit 830 also becomes "H." As a result, the drive signal Vg22 output from the OR circuit 849 becomes "L." In other words, the second main switch 22 is ON at this time. Furthermore, at this time, the drive signal Vg41 remains "L" and the drive signal Vg42 remains "H," whereby the auxiliary switch 41 and the second auxiliary switch 42 remain OFF. At this time, the input DC voltage Ei is applied to the inductor 33, whereby magnetic energy is stored.

At time t4, the comparator 810 is inverted, and the signal V2 becomes "L," whereby all the inputs of the NOR circuit 830 become "L," and the output of the OR circuit 849 to which the output of the NOR circuit being "H" is input becomes "H." As a result, the drive signal Vg22 becomes "H," whereby the second main switch 22 becomes OFF. Since the signal Vt2 remains "H" and the signal Vt3 remains "L," the drive signal Vg21 remains "H," the drive signal Vg41 remains "L," and the drive signal Vg42 remains "H." At this time, the first main switch 21 is ON, and the auxiliary switch 41 and the second auxiliary switch 42 are OFF. At this time, the magnetic energy stored in the inductor 33 is released as a current for charging the capacitor serving as the second smoothing means 62 via the second rectifying means 52. Then, at time t5, the current I33 flowing through the inductor 33 becomes zero. As shown in FIG. 9, until up to time t6, the triangular wave voltage Vt turns from rising to lowering, and the signal Vt1 becomes "L" simultaneously at that time.

At time t6, the triangular wave signal Vt turns to rising, the signal Vt1 becomes "H" again, the signal Vt2 becomes "L," and the signal Vt3 remains "L." The drive signal Vg41 is "L," and the auxiliary switch 41 remains OFF. The drive signal Vg42 becomes "L," whereby the second auxiliary switch 42 becomes ON.

Furthermore, at time t6, both the outputs of the NOR circuit 847 and the NOR circuit 828 become "L," whereby the drive signal Vg21 is "H," and the first main switch 21 is ON. The output from the NOR circuit 830 to the OR circuit 849 is "L," and the output from the NOR circuit 848 to the OR circuit 849 becomes "L" since the signal V4 is "H." Hence, the output signal of the OR circuit 849 becomes "L." In other words, since the drive signal Vg22 becomes "L," the second main switch 22 becomes ON. At this time, the input DC voltage Ei is applied to the inductor 33, whereby magnetic energy is stored.

At time t7, the comparator 844 is inverted, and the signal V4 becomes "L," whereby the output of the NOR circuit 848 becomes "H." Hence, the drive circuit Vg22, the output of the OR circuit 849, becomes "H," and the second main switch 22 becomes OFF. On the other hand, since the signal Vt2 remains "L" and the signal Vt3 remains "L," the drive signal Vg21 remains "H," the drive signal Vg41 remains "L," and the drive signal Vg42 remains "L." At this time, the first main switch 21 is ON, the auxiliary switch 41 is OFF, and the second auxiliary switch 42 is ON. At this time, since the second auxiliary switch 42 is ON, the magnetic energy stored in the inductor 33 is released as a current for charging the capacitor serving as the fourth smoothing means 64 via the fourth rectifying means 54. Then, at time t8, the current I33 flowing through the inductor 33 becomes zero. As shown in FIG. 9, until up to time t9, the triangular wave voltage Vt turns from rising to lowering, and the signal Vt1 becomes "L" simultaneously at that time.

At time t9, the triangular wave signal Vt turns to rising, the signal Vt1 becomes "H" again, the signal Vt2 becomes "H," and the signal Vt3 also becomes "H." Hence, both the drive signal Vg41 and the drive signal Vg42 become "H," whereby the auxiliary switch 41 becomes ON, and the second auxiliary switch 42 becomes OFF. Furthermore, since both the outputs of the NOR circuit 830 and the NOR circuit 848 become "L," the drive signal Vg22 becomes "L," whereby the second main switch 22 becomes ON. On the other hand, the signal V3 indicating the AND of the signal Vt and the result of the comparison between the triangular wave signal Vt and the error signal Ve3 becomes "H," and the output of the NOR circuit 828 to which the signal V3 is input, becomes "L." As a result, the drive signal Vg21 becomes "H." In other words, the first main switch 21 becomes ON. At this time, the input DC voltage Ei is applied to the inductor 33, whereby magnetic energy is stored.

At time t10, the comparator 825 is inverted, and the signal V3 becomes "L," whereby all the inputs of the NOR circuit 828 become "L." As a result, the output of the NOR circuit 828 becomes "H." Hence, the output of the NOR circuit 829, that is, the drive signal Vg21, becomes "L," and the first main switch 21 becomes OFF. On the other hand, since the signal Vt2 remains "H" and the signal Vt3 remains "H," the drive signal Vg22 remains "L," the drive signal Vg41 remains "H," and the drive signal Vg42 remains "H." At this time, the second main switch 22 and the auxiliary switch 41 remain ON, and the second auxiliary switch 42 remains OFF. At this time, since the auxiliary switch 41 is ON, the magnetic energy stored in the inductor 33 is released as a current for charging the capacitor serving as the third smoothing means 63 via the third rectifying means 53. Then, at time t11, the current I33 flowing through the inductor 33 becomes zero. As shown in FIG. 9, until up to time t12, the triangular wave voltage Vt turns from rising to lowering, and the signal Vt1 becomes "L" simultaneously at that time.

At time t12, the triangular wave signal Vt turns to rising, whereby the signal Vt1 becomes "H" again, the signal Vt2 becomes "L," the signal Vt3 becomes "H," and the above-mentioned operation after time t0 is repeated.

When it is assumed that the inductance of the inductor 33 is L, that the oscillation cycle of the oscillator 808 is T, that the ON period of the first main switch 21 and the second main switch 22, corresponding to the period in which the signal V1 is "H," just like the period between time t0 and t1 of FIG. 9, is Ton1, that the ON period of the first main switch 21 and the second main switch 22, corresponding to the period in which the signal V2 is "H," just like the period between time t3 and t4, is Ton2, that the ON period of the first main switch 21 and the second main switch 22, in which the second auxiliary switch 42 is ON, just like the period between time t6 and t7, is Ton4, that the ON period of the first main switch 21 and the second main switch 22, in which the auxiliary switch 41 is ON, just like the period between time t9 and t10, is Ton3, that the output current to the first load 71 is Io1, that the output current to the second load 72 is Io2, that the output current to the third load 73 is Io3, and that the output current to the fourth load 74 is Io4, the relationships of the following equations (6), (7), (8) and (9) are established.

$$Vo1 = Ei + (Ei \cdot Ton1)^2/(8L \cdot T \cdot Io1) \qquad (6)$$

$$Vo2 = -(Ei \cdot Ton2)^2/(8L \cdot T \cdot Io2) \qquad (7)$$

$$Vo3 = Ei + (Ei \cdot Ton3)^2/(8L \cdot T \cdot Io3) \qquad (8)$$

$$Vo4 = -(Ei \cdot Ton4)^2/(8L \cdot T \cdot Io4) \qquad (9)$$

The error signals Ve1, Ve2, Ve3 and Ve4 increase or decrease so that the first stepped-up output voltage Vo1, the first inverted output voltage Vo2, the second stepped-up output voltage Vo3 and the second inverted output voltage Vo4 are stabilized to respective desired voltages, whereby the ON periods of the first main switch 21 and the second main switch 22 are adjusted. In other words, the two step-up converters and the two inverting converters, in which the inductor 33 is shared, undergo time-shared control at 1/4 the oscillation frequency of the oscillator 808, whereby the output voltages are stabilized to the respective desired voltages.

As described above, with Embodiment 3, it is possible to obtain an excellent effect of being capable of stabilizing the two stepped-up outputs and the two inverted outputs by using a smaller number of components attained by sharing the single inductor 33.

Figure 10:
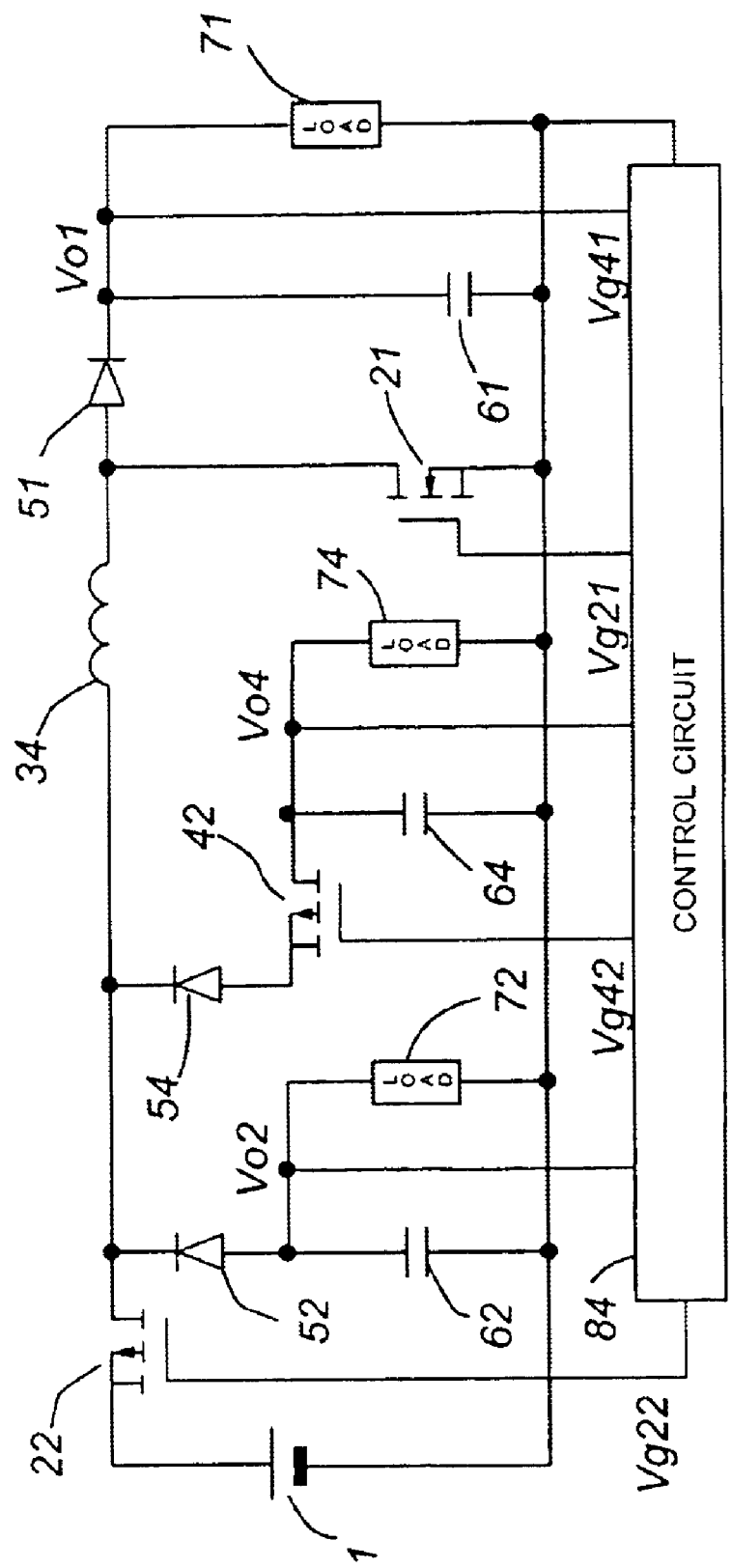
FIG. 10 is a circuit diagram showing another configuration of the multiple output DC-DC converter in accordance with Embodiment 3 of the present invention.
Figure 11:
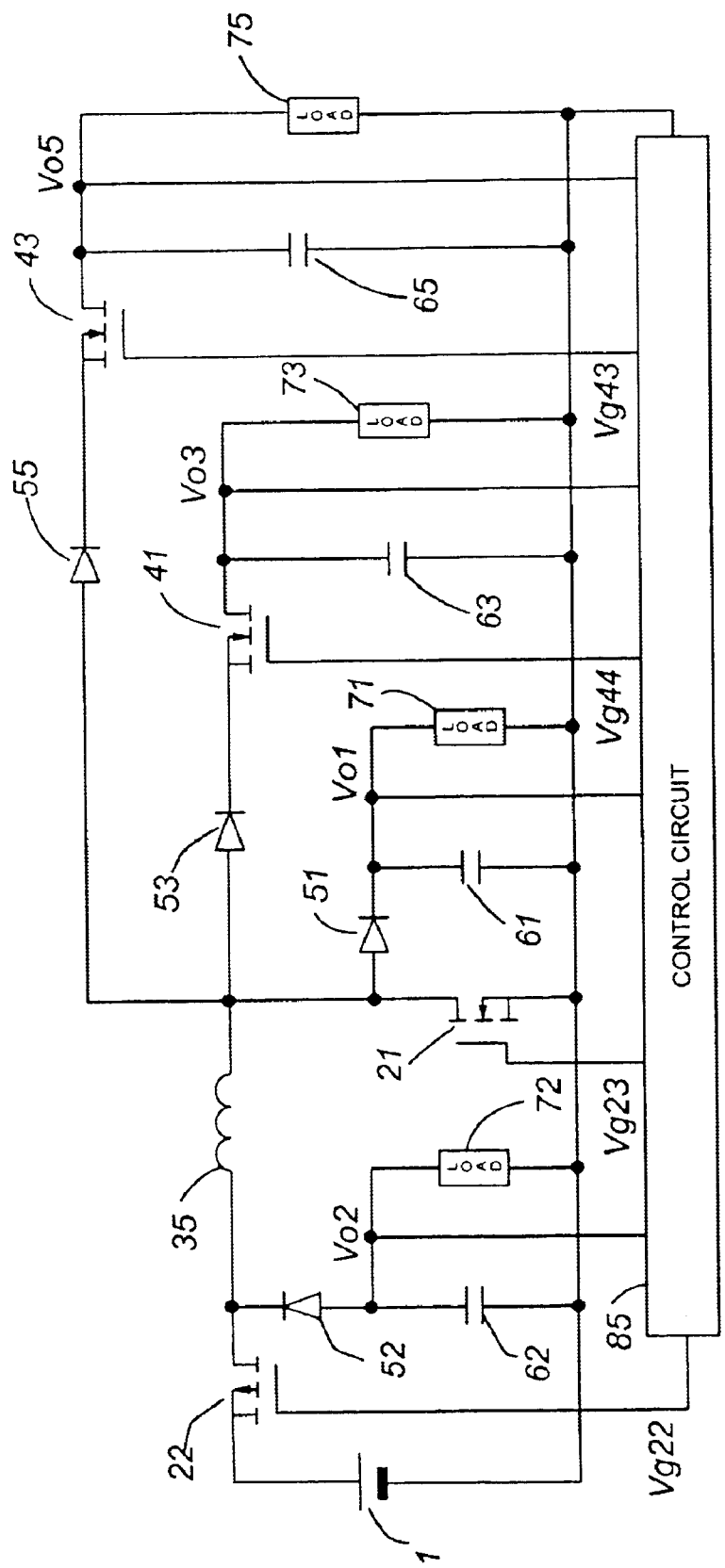
FIG. 11 is a circuit diagram showing still another configuration of the multiple output DC-DC converter in accordance with Embodiment 3 of the present invention.
Figure 12:
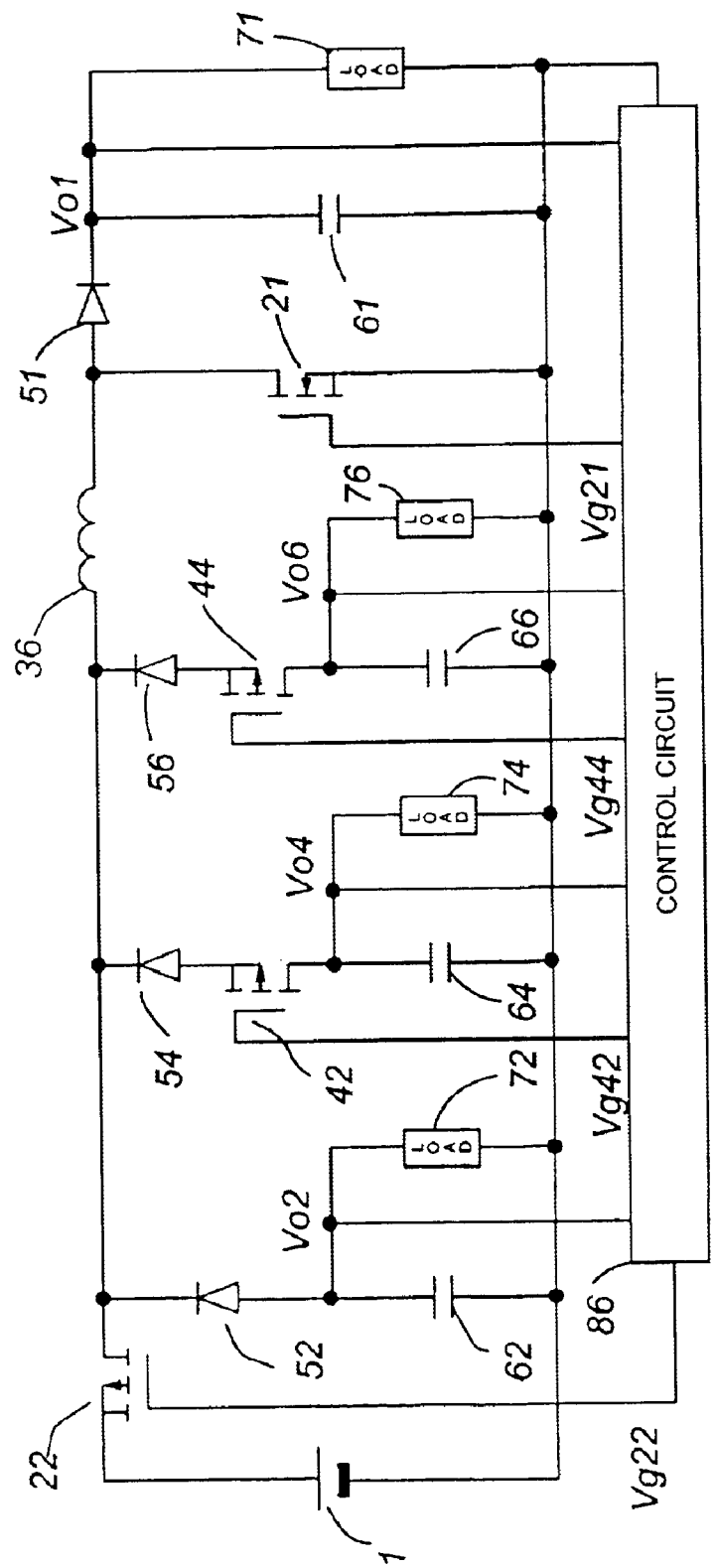
FIG. 12 is a circuit diagram showing yet still another configuration of the multiple output DC-DC converter in accordance with Embodiment 3 of the present invention.
Figure 13:
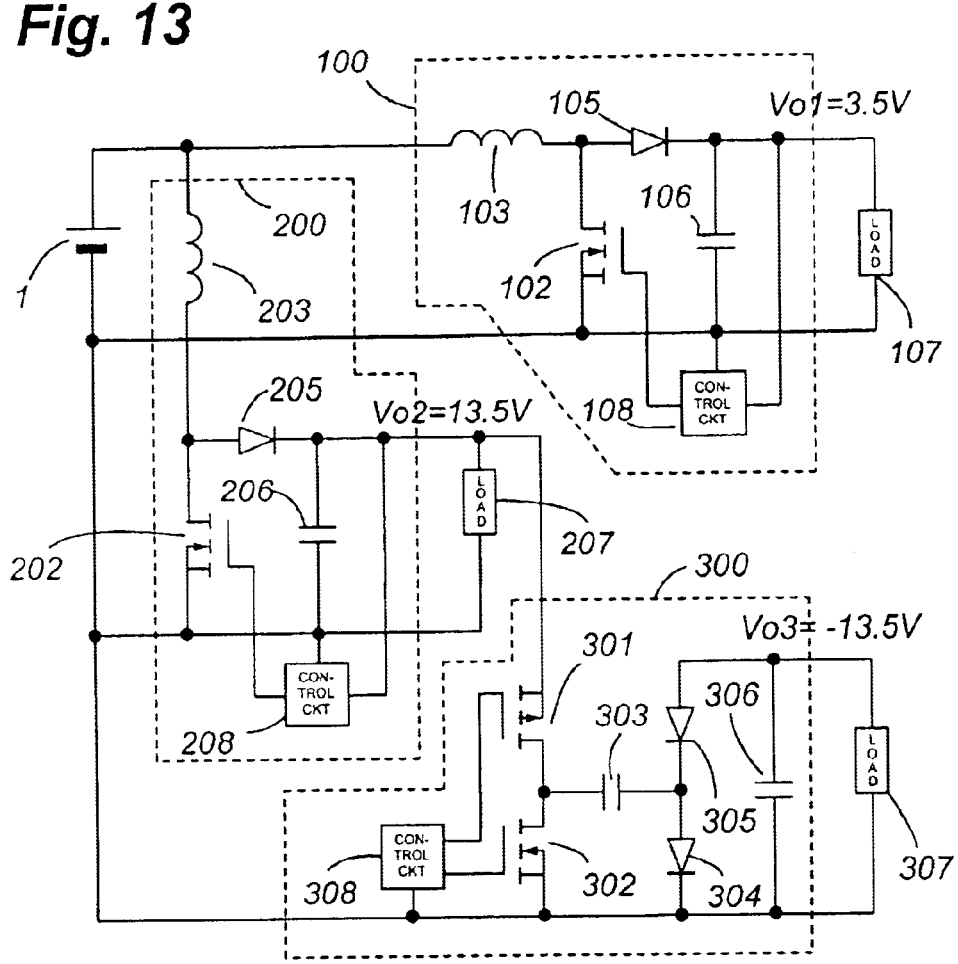
FIG. 13 is a circuit diagram showing a configuration of the prior-art multiple output DC-DC converter.
Figure 14:
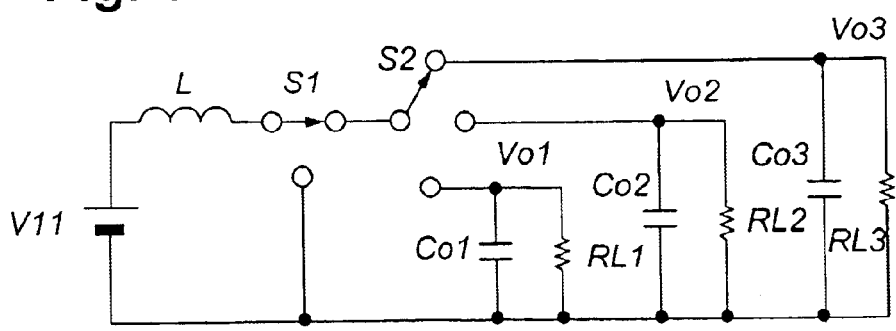
FIG. 14 is a circuit diagram showing another configuration of the prior-art multiple output DC-DC converter.

In Embodiment 3, time-shared control at 1/4 the oscillation frequency of the oscillator 808 is assigned to the two step-up converters and the two inverting converters; however, the multiple output DC-DC converter in accordance with the present invention is not limited to have this configuration. The multiple output DC-DC converter in accordance with the present invention can have a configuration formed of one step-up converter and two inverting converters as shown in a circuit diagram in FIG. 10, for example, although explanations are omitted. As shown in FIG. 10, the configuration may include a control circuit 84. In addition, the multiple output DC-DC converter in accordance with the present invention can have a configuration formed of three step-up converters and one-inverting converter as shown in another circuit diagram in FIG. 11. As shown in FIG. 11, the configuration can include a load 75 and a control circuit 85. Furthermore, the multiple output DC-DC converter in accordance with the present invention can have a configuration formed of one step-up converter and three inverting converters as shown in still another circuit diagram in FIG. 12. As shown in FIG. 12, the configuration can include a load 76 and a control circuit 86.

By applying the control method described in the above-mentioned Embodiment 3, time-shared control can be carried out at (−N)th power of 2 times the oscillation frequency of the oscillator 808 by using N stages of T flip-flops serving as frequency division circuits. With this configuration, it is possible to provide a multiple output DC-DC converter capable of controlling a plurality of step-up converters and a plurality of inverting converters, not more than Nth power of 2 in total.

As clarified by the above detailed explanations of the embodiments, the present invention has the following effects.

The multiple output DC-DC converter in accordance with the present invention requires only one inductor in order to supply controlled step-up or inverted outputs to a plurality of loads, whereby it can be configured by using a smaller number of components. For example, the power source circuit for the liquid crystal panel of the prior-art portable apparatus comprised two step-up converters and one inverting-type switched capacitor and requires eight semiconductor switches including diodes, two inductors and four capacitors. The output voltage from the inverting-type switched capacitor was unable to be controlled. As described in the above-mentioned Embodiment 2, by applying the present invention to this power source circuit, it can comprise six semiconductor switches, one inductor and three capacitors. In addition, each output can be controlled by adjusting the ON/OFF period ratio of the main switch circuit corresponding thereto.

Furthermore, the present invention does not require series regulators or switched capacitors, thereby having an excellent effect of being capable of obtaining highly efficient features inherent in a switching converter.

Although the present invention has been described with respect to its preferred embodiments in some detail, the disclosed contents of the preferred embodiments may change in the details of the structure thereof, and any changes in the combination and sequence of the components may be attained without departing from the scope and spirit of the claimed invention.

Industrial Applicability

The multiple output DC-DC converter in accordance with the present invention is used as a power source for driving electronic components installed in various electronic apparatuses, such as portable apparatuses, requiring a plurality of power source voltages; the present invention is thus highly versatile.

What is claimed is:

1. A multiple output DC-DC converter comprising:
   one inductor,
   an input DC power source for outputting an input voltage,
   a main switch circuit, having an ON state, a first OFF state and a second OFF state, for applying said input voltage to said inductor at the time of said ON state,
   a step-up rectifying and smoothing circuit, connected to one terminal of said inductor, for rectifying and smoothing a voltage generating in said inductor at the time of said first OFF state and for outputting a stepped-up output voltage obtained by stepping up said input voltage,
   an inverting rectifying and smoothing circuit, connected to the other terminal of said inductor, for rectifying and smoothing a voltage generating in said inductor at the time of said second OFF state and for outputting an inverted output voltage obtained by inverting and stepping up or down said input voltage, and
   a control circuit for controlling the ON/OFF period ratio of said main switch circuit so that the stepped-up output voltage and the inverted output voltage have a desired value;

wherein
   said main switch circuit comprises:
   a first main switch connected between one terminal of said inductor and the negative electrode of said input DC power source, and a second main switch connected between the other terminal of said inductor and the positive electrode of said input DC power source;
   the ON state of said main switch circuit is a state in which both said first main switch and said second switch are ON, said first OFF state is a state in which said first main switch is OFF and said second main switch is ON, and said second OFF state is a state in which said first main switch is ON and said second main switch is OFF;
   said control circuit comprises:
   a detection circuit for detecting said stepped-up output voltage and outputting a stepped-up output error signal corresponding to said stepped-up output voltage, and for detecting said inverted output voltage and outputting an inverted output error signal corresponding to said inverted output voltage;
   an oscillation circuit for outputting a triangular wave voltage having a predetermined switching frequency and a pulse signal on the basis of said triangular wave voltage;
   a frequency division circuit for dividing said switching frequency and outputting signals indicating a first state and a second state;
   a PMW circuit for outputting a stepped-up output pulse signal having a pulse width corresponding to said stepped-up output voltage by said pulse signal and a comparison result between said triangular wave voltage and said stepped-up output error signal, and further for outputting an inverted output pulse signal having a pulse width corresponding to said inverted output voltage by said pulse signal and a comparison result between said inverted output error signal and said triangular wave voltage; and
   a logic circuit for receiving the output of said frequency division circuit, said stepped-up output pulse signal and said inverted output pulse signal, and for outputting a main switch drive signal to make said first OFF state after said main switch circuit is turned ON only in a period set by said stepped-up output pulse signal in the case when the output of said frequency division circuit is in said first state, and to make said second OFF state after said main switch circuit is turned ON only in a period set by said inverted output pulse signal in the case when the output of said frequency division circuit is in said second state, and
   said control circuit drives said first main switch and said second main switch in respective predetermined ON and OFF periods, controls the ON/OFF period ratio of said first main switch so that said stepped-up output voltage has a desired value and controls the ON/OFF period ratio of said second main switch so that said inverted output voltage has a desired value.

2. A multiple output DC-DC converter in accordance with claim 1, comprising:
   a plurality of said step-up rectifying and smoothing circuits and a stepped-up output auxiliary switch circuit for selecting one of said plurality of step-up rectifying and smoothing circuits at the time of said first OFF state, and
   a plurality of said inverting rectifying and smoothing circuits and an inverted output auxiliary switch circuit for selecting one of said plurality of inverting rectifying and smoothing circuits at the time of said second OFF state.

3. A multiple output DC-DC converter in accordance with claim 2, wherein said stepped-up output auxiliary switch circuit comprises first to nth (n: a natural number) stepped-up output auxiliary switches, said plurality of step-up rectifying and smoothing circuits include a first step-up rectifying and smoothing circuit, formed of a series circuit of first stepped-up output rectifying means and first stepped-up output smoothing means, for outputting a first stepped-up output voltage, said kth (k=1 to n) stepped-up output auxiliary switch, and a (k+1)th step-up rectifying and smoothing circuit, formed of a series circuit of (k+1)th stepped-up output rectifying means and (k+1)th stepped-up output smoothing means, for outputting a (k+1)th stepped-up output voltage, said inverted output auxiliary switch circuit comprises first to mth (m: a natural number) inverted output auxiliary switches, said plurality of inverting rectifying and smoothing circuits include a first inverting rectifying and smoothing circuit, formed of a series circuit of first inverted output rectifying means and first inverted output smoothing means, for outputting a first inverted output voltage, said jth (j=1 to m) inverted output auxiliary switch, and a (j+1)th inverting rectifying and smoothing circuit, formed of a series circuit of (j+1)th inverted output rectifying means and (j+1)th inverted output smoothing means, for outputting a (k+1)th inverted output voltage, and a control circuit is provided to turn ON/OFF said first main switch at least once in a period in which said second main switch becomes ON and all of said first to nth stepped-up output auxiliary switches become OFF and to control the ON/OFF period ratio so that said first stepped-up output voltage has a desired value; to turn ON/OFF said first main switch at least once in a period in which said second main switch is ON and said kth stepped-up output auxiliary switch is ON and to control the ON/OFF period ratio so that said (k+1)th stepped-up output voltage has a desired value; to turn ON/OFF said second main switch at least once in a period in which said first main switch becomes ON and all of said first to mth inverted output auxiliary switches become OFF and to control the ON/OFF period ratio so that said first inverted output voltage has a desired value; and to turn ON/OFF said second main switch at least once in a period in which said first main switch is ON and said jth auxiliary switch is ON and to control the ON/OFF period ratio so that said (j+1)th inverted output voltage has a desired value.

4. A multiple output DC-DC converter in accordance with claim 3, wherein said control circuit comprises:

a detection circuit for detecting said (n+1) stepped-up output voltages and outputting (n+1) stepped-up output error signals corresponding to said (n+1) stepped-up output voltages and for detecting said (m+1) inverted output voltages and outputting (m+1) inverted output error signals corresponding to said (m+1) inverted output voltages, an oscillation circuit for outputting a triangular wave signal having a predetermined switching frequency, a frequency division circuit for dividing said switching frequency and for outputting a signal for selecting one of said (n+1) stepped-up output voltages and said (m+1) inverted output voltages, a PWM circuit for receiving said triangular wave signal, said (n+1) stepped-up output error signals and said (m+1) inverted output error signals and for outputting (n+1) stepped-up output pulse signals having pulse widths corresponding to said (n+1) stepped-up output voltages and (m+1) inverted output pulse signals having pulse widths corresponding to said (m+1) inverted output voltages, and a logic circuit for receiving the output of said frequency division circuit, said (n+1) stepped-up output pulse signals and said (m+1) inverted output pulse signals and for outputting a main switch drive signal, a stepped-up output auxiliary switch drive signal and an inverted output auxiliary switch drive signal to drive said main switch circuit, in the case when the output of said frequency division circuit selects said first stepped-up output voltage, to turn OFF all of said stepped-up output auxiliary switch circuits and to obtain said first OFF state after said main switch circuit is turned ON only in a period set by said first stepped-up output pulse signal; to drive said main switch circuit, in the case when the output of said frequency division circuit selects a (k+1)th (k: a natural number not larger than n) stepped-up output voltage, to turn ON only said (k+1)th stepped-up output auxiliary switch circuit and to obtain said first OFF state after said main switch circuit is turned ON only in a period set by said (k+1)th stepped-up output pulse signal; to drive said main switch circuit, in the case when the output of said frequency division circuit selects said first inverted output voltage, to turn OFF all of said inverted output auxiliary switch circuits and to obtain said second OFF state after said main switch circuit is turned ON only in a period set by said first inverted output pulse signal; and to drive said main switch circuit, in the case when the output of said frequency division circuit selects a (j+1)th (j: a natural number not larger than m) stepped-up output voltage, to turn ON only said (j+1)th stepped-up output auxiliary switch circuit and to obtain said first OFF state after said main switch circuit is turned ON only in a period set by said (j+1)th stepped-up output pulse signal.

5. A multiple output DC-DC converter in accordance with claim 1, provided with a plurality of said step-up rectifying and smoothing circuits and having a stepped-up output auxiliary switch circuit for selecting one of said plurality of step-up rectifying and smoothing circuits at the time of said first OFF state.

6. A multiple output DC-DC converter in accordance with claim 5, wherein said stepped-up output auxiliary switch circuit comprises first to nth (n: a natural number) stepped-up output auxiliary switches, said plurality of step-up rectifying and smoothing circuits include a first step-up rectifying and smoothing circuit, formed of a series circuit of first stepped-up output rectifying means and first stepped-up output smoothing means, for outputting a first stepped-up output voltage, said kth (k=1 to n) stepped-up output auxiliary switch, and a (k+1)th step-up rectifying and smoothing circuit, formed of a series circuit of (k+1)th stepped-up output rectifying means and (k+1)th stepped-up output smoothing means, for outputting a (k+1)th stepped-up output voltage, and a control circuit is provided to turn ON/OFF said first main switch at least once in a period in which said second main switch becomes ON and all of said first to nth stepped-up output auxiliary switches become OFF and to control the ON/OFF period ratio so that said first stepped-up output voltage has a desired value; to turn ON/OFF said first main switch at least once in a period in which said second main switch is ON and said kth stepped-up output auxiliary switch is ON and to control the ON/OFF period ratio so that said (k+1)th stepped-up output voltage has a desired value; and to turn ON/OFF said second main switch at least once in a period in which said first main switch is ON and to control the ON/OFF period ratio so that said inverted output voltage has a desired value.

7. A multiple output DC-DC converter in accordance with claim 6, wherein said control circuit comprises:

a detection circuit for detecting said (n+1) stepped-up output voltages and outputting (n+1) stepped-up output error signals corresponding to said (n+1) stepped-up output voltages and for detecting said inverted output voltage and outputting an inverted output error signal corresponding to said inverted output voltage, an oscillation circuit for outputting a triangular wave voltage having a predetermined switching frequency, a frequency division circuit for dividing said switching frequency and for outputting a signal for selecting one of said (n+1) stepped-up output voltages and said inverted output voltage, a PWM circuit for receiving said triangular wave voltage, said (n+1) stepped-up output error signals and said inverted output error signal and for outputting (n+1) stepped-up output pulse signals having pulse widths corresponding to said (n+1) stepped-up output voltages and an inverted output pulse signal having a pulse width corresponding to said inverted output voltage, and a logic circuit for receiving the output of said frequency division circuit, said (n+1) stepped-up output pulse signals and said inverted output pulse signal and for outputting a main switch drive signal and a stepped-up output auxiliary switch drive signal to drive said main switch circuit, in the case when the output of said frequency division circuit selects said first stepped-up output voltage, to turn off all of said stepped-up output auxiliary switch circuits and to obtain said first OFF state after the said main switch circuit is turned ON only in a period set by said first stepped-up output pulse signal; to drive said main switch circuit, in the case when the output of said frequency division circuit selects a (k+1)th (k: a natural number not larger than n) stepped-up output voltage, to turn ON only said (k+1)th stepped-up output auxiliary switch circuit and to obtain said first OFF state after said main switch circuit is turned ON only in a period set by said (k+1)th stepped-up output pulse signal; and to drive said main switch circuit, in the case when the output of said frequency division circuit selects said inverted output voltage, to obtain said second OFF state after said main switch circuit is turned ON only in a period set by said inverted output pulse signal.

8. A multiple output DC-DC converter in accordance with claim 1, provided with a plurality of said inverting rectifying and smoothing circuits and having an inverted output auxiliary switch circuit for selecting one of said plurality of inverting rectifying and smoothing circuits at the time of said second OFF state.

9. A multiple output DC-DC converter in accordance with claim 8, wherein said inverted output auxiliary switch circuit comprises first to mth (m: a natural number) inverted output auxiliary switches, said plurality of inverting rectifying and smoothing circuits include a first inverting rectifying and smoothing circuit, formed of a series circuit of first inverted output rectifying means and first inverted output smoothing means, for outputting a first inverted output voltage, said jth (j=1 to m) inverted output auxiliary switch, and a (j+1)th inverting rectifying and smoothing circuit, formed of a series circuit of (j+1)th inverted output rectifying means and (j+1)th inverted smoothing means, for outputting a (j+1)th inverted output voltage, and a control circuit is provided to turn ON/OFF said first main switch at least once in a period in which said second main switch becomes ON and to control the ON/OFF period ratio so that said stepped-up output voltage has a desired value; to turn ON/OFF said second main switch at least once in a period in which said first main switch becomes ON and all of said first to mth inverted output auxiliary switches become OFF and to control the ON/OFF period ratio so that said first inverted output voltage has a desired value; and to turn ON/OFF said second main switch at least once in a period in which said first main switch is ON and said jth inverted output auxiliary switch is ON and to control the ON/OFF period ratio so that said (j+1)th inverted output voltage has a desired value.

10. A multiple output DC-DC converter comprising:

an input DC power source, a step-up rectifying and smoothing circuit having a first main switch, one terminal of which is connected to the negative electrode of said input DC power source, and a series circuit of rectifying means and smoothing means, an inverting rectifying and smoothing circuit having a second main switch, one terminal of which is connected to the positive electrode of said input DC power source, and a series circuit of rectifying means and smoothing means;

at least one inductor connected between the other terminal of said first main switch and the other terminal of said second main switch;

a control circuit for driving said first main switch and said second main switch in respective predetermined ON and OFF periods, for controlling the ON/OFF period ratio of said first main switch so that the stepped-up output voltage outputted from said step-up rectifying and smoothing circuit has a desired value, and for controlling the ON/OFF period ratio of said second main switch so that the inverted output voltage outputted from said inverting rectifying and smoothing circuit has a desired value;

wherein said control circuit comprises:

a detection circuit for detecting said stepped-up output voltage and outputting a stepped-up output error signal corresponding to said stepped-up output voltage, and for detecting said inverted output voltage and outputting an inverted output error signal corresponding to said inverted output voltage;

an oscillation circuit for outputting a triangular wave voltage having a predetermined switching frequency and a pulse signal on the basis of said triangular wave voltage;

a frequency division circuit for dividing said switching frequency and outputting signals indicating a first state and a second state;

a PMW circuit for outputting a stepped-up output pulse signal having a pulse width corresponding to said stepped-up output voltage by said pulse signal and a comparison result between said triangular wave voltage and said stepped-up output error signal, and further for outputting an inverted output pulse signal having a pulse width corresponding to said inverted output voltage by said pulse signal and a comparison result between said inverted output error signal and said triangular wave voltage; and a logic circuit for receiving the output of said frequency division circuit, said stepped-up output pulse signal and said inverted output pulse signal, and for outputting a main switch drive signal to make said second main switch OFF state only after both said first main switch and said second main switch are turned ON only in a period set by said stepped-up output pulse signal in the case when the output of said frequency division circuit is in said first state, and to make said first main switch OFF state only after both said first main switch and said second main switch are turned ON only in a period set by said inverted output pulse signal in the case when the output of said frequency division circuit is in said second state.

11. A multiple output DC-DC converter in accordance with claim 10, comprising:

a plurality of said step-up rectifying and smoothing circuits and a stepped-up output auxiliary switch circuit for selecting one of said plurality of step-up rectifying and smoothing circuits at the time when said first main switch is OFF, and a plurality of said inverting rectifying and smoothing circuits and an inverted output auxiliary switch circuit for selecting one of said plurality of inverting rectifying and smoothing circuits at the time when said second main switch is OFF.

12. A multiple output DC-DC converter in accordance with claim 11, wherein said stepped-up output auxiliary switch circuit comprises first to nth (n: a natural number) stepped-up output auxiliary switches, said plurality of step-up rectifying and smoothing circuits include a first step-up rectifying and smoothing circuit, formed of a series circuit of first stepped-up output rectifying means and first stepped-up output smoothing means, for outputting a first stepped-up output voltage, said kth (k=1 to n) stepped-up output auxiliary switch, and a (k+1)th step-up rectifying and smoothing circuit, formed of a series circuit of (k+1)th stepped-up output rectifying means and (k+1)th step-up smoothing means, for outputting a (k+1)th stepped-up output voltage, said inverted output auxiliary switch circuit comprises first to mth (m: a natural number) inverted output auxiliary switches, said plurality of inverting rectifying and smoothing circuits include a first inverting rectifying and smoothing circuit, formed of a series circuit of first inverted output rectifying means and first inverted output smoothing means, for outputting a first inverted output voltage, said jth (j=1 to m) inverted output auxiliary switch, and a (j+1)th inverting rectifying and smoothing circuit, formed of a series circuit of (j+1)th inverted output rectifying means and (j+1)th inverted smoothing means, for outputting a (j+1)th inverted output voltage, and a control circuit is provided to turn ON/OFF said first main switch at least once in a period in which said second main switch becomes ON and all of said first to nth stepped-up output auxiliary switches become OFF and to control the ON/OFF period ratio so that said first stepped-up output voltage has a desired value; to turn ON/OFF said first main switch at least once in a period in which said second main switch is ON and said kth stepped-up output auxiliary switch is ON and to control the ON/OFF period ratio so that said (k+1)th stepped-up output voltage has a desired value; to turn ON/OFF said second main switch at least once in a period in which said first main switch becomes ON and all of said first to mth inverted output auxiliary switches become OFF and to control the ON/OFF period ratio so that said first inverted output voltage has a desired value; and to turn ON/OFF said second main switch at least once in a period in which said first main switch is ON and said jth inverted output auxiliary switch is ON and to control the ON/OFF period ratio so that said (j+1)th inverted output voltage has a desired value.

13. A multiple output DC-DC converter in accordance with claim 12, wherein said control circuit comprises:

a detection circuit for detecting said (n+1) stepped-up output voltages and outputting (n+1) stepped-up output error signals corresponding to said (n+1) stepped-up output voltages and for detecting said (m+1) inverted output voltages and outputting (m+1) inverted output error signals corresponding to said (m+1) inverted output voltages, an oscillation circuit for outputting a triangular wave voltage having a predetermined switching frequency, a frequency division circuit for dividing said switching frequency and for outputting a signal for selecting one of said (n+1) stepped-up output voltages and said (m+1) inverted output voltages, a PWM circuit for receiving said triangular wave voltage, said (n+1) stepped-up output error signals and said (m+1) inverted output error signals and for outputting (n+1) stepped-up output pulse signals having pulse widths corresponding to said (n+1) stepped-up output voltages and (m+1) inverted output pulse signals having pulse widths corresponding to said (m+1) inverted output voltages, and a logic circuit for receiving the output of said frequency division circuit, said (n+1) stepped-up output pulse signal and said (m+1) inverted output error signals and for outputting a main switch drive signal, a stepped-up output auxiliary switch drive signal and an inverted output auxiliary switch to turn OFF all of said stepped-up output auxiliary switch circuits and to turn OFF said first main switch after both said first main switch and said second main switch are turned ON only in a period set by said first stepped-up output pulse signal in the case when the output of said frequency division circuit selects said first stepped-up output voltage; to turn ON only said (k+1)th stepped-up output auxiliary switch circuit and to turn ON said first main switch after both said first main switch and said second main switch are turned ON only in a period set by said (k+1)th stepped-up output pulse signal in the case when the output of said frequency division circuit selects a (k+1)th (k is a natural number not larger than n) stepped-up output voltage; to turn OFF all of said inverted output auxiliary switch circuits and to turn OFF said second main switch after both said first main switch and said second main switch are turned ON only in a period set by said first inverted output pulse signal in the case when the output of said frequency division circuit selects said first inverted output voltage; and to turn ON only said (j+1)th stepped-up output auxiliary switch circuit and to turn OFF said first main switch after both said first main switch and said second main switch are turned ON only in a period set by said (j+1)th stepped-up output pulse signal in the case when the output of said frequency division circuit selects a (j+1)th (j: a natural number not larger than m) stepped-up output voltage.

14. A multiple output DC-DC converter in accordance with claim 10, provided with a plurality of said step-up rectifying and smoothing circuits and having a stepped-up output auxiliary switch circuit for selecting one of said plurality of step-up rectifying and smoothing circuits at the time when said first main switch is OFF.

15. A multiple output DC-DC converter in accordance with claim 14, wherein said stepped-up output auxiliary switch circuit comprises first to nth (n: a natural number) stepped-up output auxiliary switches, said plurality of step-up rectifying and smoothing circuits include a first step-up rectifying and smoothing circuit, formed of a series circuit of first stepped-up output rectifying means and first stepped-up output smoothing means, for outputting a first stepped-up output voltage, said kth (k=1 to n) stepped-up output auxiliary switch, and a (k+1)th step-up rectifying and smoothing circuit, formed of a series circuit of (k+1)th stepped-up output rectifying means and (k+1)th stepped-up output smoothing means, for outputting a (k+1)th stepped-up output voltage, and a control circuit is provided to turn ON/OFF said first main switch at least once in a period in which said second main switch becomes ON and all of said first to nth stepped-up output auxiliary switches become OFF and to control the ON/OFF period ratio so that said first stepped-up output voltage has a desired value; to turn ON/OFF said first main switch at least once in a period in which said second main switch is ON and said kth stepped-up output auxiliary switch is ON and to control the ON/OFF period ratio so that said (k+1)th stepped-up output voltage has a desired value; and to turn ON/OFF said second main switch at least once in a period in which said first main switch becomes ON and to control the ON/OFF period ratio so that said inverted output voltage has a desired value.

16. A multiple output DC-DC converter in accordance with claim 15, wherein said control circuit comprises:

a detection circuit for detecting said (n+1) stepped-up output voltages and outputting (n+1) stepped-up output error signals corresponding to said (n+1) stepped-up output voltages and for detecting said inverted output voltage and outputting an inverted output error signal corresponding to said inverted output voltage, an oscillation circuit for outputting a triangular wave voltage having a predetermined switching frequency, a frequency division circuit for dividing said switching frequency and for outputting a signal for selecting one of said (n+1) stepped-up output voltages and said inverted output voltage, a PWM circuit for receiving said triangular wave voltage, said (n+1) stepped-up output error signals and said inverted output error signal and for outputting (n+1) stepped-up output pulse signals having pulse widths corresponding to said (n+1) stepped-up output voltages and an inverted output pulse signal having a pulse width corresponding to said inverted output voltage, and a logic circuit for receiving the output of said frequency division circuit, said (n+1) stepped-up output pulse signal and said inverted output pulse signal and for outputting a main switch drive signal and a stepped-up output auxiliary switch drive signal to carry out driving, in the case when the output of said frequency division circuit selects said first stepped-up output voltage, to turn OFF all of said stepped-up output auxiliary switch circuits and to turn OFF said first main switch after both said first main switch and said second main switch are turned ON only in a period set by said first stepped-up output pulse signal; to carry out driving, in the case when the output of said frequency division circuit selects a (k+1)th (k: a natural number not larger than n) stepped-up output voltage, to turn ON only said (k+1)th stepped-up output auxiliary switch circuit and to turn OFF said first main switch after both said first main switch and said second main switch are turned ON only in a period set by said (k+1)th stepped-up output pulse signal; and to carry out driving, in the case when the output of said frequency division circuit selects said inverted output voltage, to turn OFF said second main switch after both said first main switch and said second main switch are turned ON only in a period set by said inverted output pulse signal.

17. A multiple output DC-DC converter in accordance with claim 10, provided with a plurality of said inverting rectifying and smoothing circuits and having an inverted output auxiliary switch circuit for selecting one of said plurality of inverting rectifying and smoothing circuits at the time when said second main switch is OFF.

18. A multiple output DC-DC converter in accordance with claim 17, wherein said inverted output auxiliary switch circuit comprises first to mth (m: a natural number) inverted output auxiliary switches, said plurality of inverting rectifying and smoothing circuits include a first inverting rectifying and smoothing circuit, formed of a series circuit of first inverted output rectifying means and first inverted output smoothing means, for outputting a first inverted output voltage, said jth (j=1 to m) inverted output auxiliary switch, and a (j+1)th inverting rectifying and smoothing circuit, formed of a series circuit of (j+1)th inverted output rectifying means and (j+1)th inverted output smoothing means, for outputting a (j+1)th inverted output voltage, and a control circuit is provided to turn ON/OFF said first main switch at least once in a period in which said second main switch becomes ON and to control the ON/OFF period ratio so that said stepped-up output voltage has a desired value; to turn ON/OFF said second main switch at least once in a period in which said first main switch becomes ON and all of said first to mth inverted output auxiliary switches become OFF and to control the ON/OFF period ratio so that said first inverted output voltage has a desired value; and to turn ON/OFF said second main switch at least once in a period in which said first main switch is ON and said jth inverted output auxiliary switch is ON and to control the ON/OFF period ratio so that said (j+1)th inverted output voltage has a desired value.

* * * * *

UNITED STATES PATENT AND TRADEMARK OFFICE
CERTIFICATE OF CORRECTION

PATENT NO. : 6,946,820 B2
DATED : September 20, 2005
INVENTOR(S) : Ishii et al.

It is certified that error appears in the above-identified patent and that said Letters Patent is hereby corrected as shown below:

Column 18,
Line 29, delete "PMW" and replace with -- PWM --.

Column 23,
Line 4, delete "PMW" and replace with -- PWM --.

Signed and Sealed this

Fourteenth Day of February, 2006

JON W. DUDAS
*Director of the United States Patent and Trademark Office*